US006707454B1

(12) United States Patent
Barg et al.

(10) Patent No.: US 6,707,454 B1
(45) Date of Patent: Mar. 16, 2004

(54) SYSTEMS AND METHODS FOR VISUALIZING MULTI-DIMENSIONAL DATA IN SPREADSHEETS AND OTHER DATA STRUCTURES

(75) Inventors: Timothy A. Barg, Wheaton, IL (US); Susan K. Burkwald, Naperville, IL (US); Stephen G. Eick, Naperville, IL (US); Brenda A. Garity, Plainfield, IL (US); Dianne K. Hackborn, Naperville, IL (US); Barbara R. Mirel, Naperville, IL (US); William C. Swanson, St. Charles, IL (US); Michael S. Tatelman, Long Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/415,923

(22) Filed: Oct. 12, 1999

Related U.S. Application Data

(60) Provisional application No. 60/141,857, filed on Jul. 1, 1999.

(51) Int. Cl.⁷ .................................................. G06F 3/14
(52) U.S. Cl. ....................................................... 345/440
(58) Field of Search .............................. 345/440, 440.2; 707/503, 903; 705/10; 715/503, 903

(56) References Cited

U.S. PATENT DOCUMENTS

| 5,461,708 A | * | 10/1995 | Kahn | 345/440 |
| 5,774,878 A | * | 6/1998 | Marshall | 705/10 |
| 5,835,085 A | * | 11/1998 | Eick et al. | 345/440 |
| 6,188,403 B1 | * | 2/2001 | Sacerdoti et al. | 345/440 |
| 6,222,540 B1 | * | 4/2001 | Sacerdoti | 345/440 |
| 6,301,579 B1 | * | 10/2001 | Becker | 345/440 |

OTHER PUBLICATIONS

Daniel A. Keim et al., Possibilities and Limits in Visualizing Large Amounts of Multidemsional Data, 1994, Perceptual Issues in Visualization, pp. 1–20.*
Steven F. Roth et al., Visage: A User Interface Environment for Exploding Information, 1996, IEEE In Proceedings of Information Visulation, 8 pages.*
Ed Huai–hsin Chi, et al., A spreadsheet approach to information visualization, 1997, ACM Press, pp. 79–80.*
Ed huai–hsin Chi, et al., Principles for Information Visualization Spreadsheets, IEEE, Jul./Aug. 1998, pp. 30–38.*
"The Data Warehouse Lifecycle Toolkit: Expert Methods for Designing, Developing, and Deploying Data Warehouses", Ralph Kimball et al., *Wiley Computer Publishing*, 1998.
"OLAP Solutions: Building Multidimensional Information Systems", Erik Thomsen, *Wiley Computer Publishing*, 1997.

* cited by examiner

*Primary Examiner*—Jeffery Brier

(57) ABSTRACT

The data visualization systems and methods of this invention provide a powerful tool for visualizing multi-dimensional databases. In one exemplary embodiment, the data visualization systems and methods of this invention visualize pivot tables using two novel visual metaphors: a single measure perspective consisting of linked bar charts and a multiscape landscape visualization; and a anchored measures perspective for displaying several measures simultaneously. The data visualization systems and methods of this invention usefully display much larger pivot tables than is possible using conventional interfaces and provide the ability to navigate through complex cubes to identify important structures. In various exemplary embodiments, the data visualization systems and methods of this invention attach to MS Excel™ as an add-on, access pivot tables directly from SQL Server 7.0, and integrate with MS Office.

69 Claims, 29 Drawing Sheets

(10 of 29 Drawing Sheet(s) Filed in Color)

SYSTEMS AND METHODS FOR VISUALIZING MULTI-DIMENSIONAL DATA IN SPREADSHEETS AND OTHER DATA STRUCTURES

This non-provisional application claims the benefit of U.S. provisional application No. 60/141,857, entitled "Systems And Methods For Visualizing Multi-Dimensional Data In Spreadsheets And Other Data Structures", filed on Jul. 1, 1999, and which is incorporated herein by reference in its entirety. The applicant of the provisional application is William C. Swanson.

COLOR DRAWINGS

This application file contains at least one drawing executed in color. Copies of this patent or patent application publication with color drawing(s) will be provided by the Office upon request and payment of the necessary fee.

BACKGROUND OF THE INVENTION

1. Field of Invention

This invention relates to visualizing multiple-dimension data.

2. Description of Related Art

With the decreasing cost of storage and increased bandwidth of networks, storing large volumes of fine grain data has become technically feasible and cost effective. In business environments, this fine grain data typically includes, for example, transactions, sales records, and/or customer information. This fine grain data is typically stored in warehouses or data marts. When properly analyzed, this fine grain data provides a rich analysis source for understanding customer behavior.

Transactions collected by operational systems are frequently stored in relational tables. For a variety of reasons, including data cleanliness, scalability, efficiency of the relational method, difficulty in building schemas, and computational complexity, analyzing, understanding, and making business decisions using raw relational tables is difficult. Unfortunately, the relational model and the standard interface of the structured query language (SQL) used to manipulate relational tables, as described in *A Guide to the SQL Standard*, C. J. Date et al, Addison-Wesley, Reading, Mass., 1997, are not well-suited for analysis tasks. When submitted against warehouses that have been engineered for fast transaction archiving, analysis queries frequently run extremely slowly. For example, a multi-million dollar warehouse may only be able to support one or two power analysis users.

One conventional approach for overcoming the analysis problem promulgated by business intelligence software vendors involves aggregating transactions into multi-dimensional databases, which are also referred to as "data cubes". This is described in "Extending the database relational model to capture more meaning," E. F. Codd, Association for Computing Machinery, 1997 and *OLAP Solutions*, E. Thomsen, John Wiley and Sons, New York, 1997.

The data cube, that is, the raw data structure of a multi-dimensional database, organizes information along a sequence of categories. The categorizing variables are called dimensions. The data, called the measures, is stored in cells. One common use of data cubes is to store aggregated sales transactions. In this case, for example, the cube dimensions might be product, store, department, customer number, region, month, while the measures might be cost of goods sold (COGS), sales, and profit. The dimensions are pre-defined indices into a cell of the data cube.

The measures in a cell are roll-ups over the transactions. The roll-ups or aggregations of the transactions are usually sums of the transactions. However, the rollups or aggregations of the transactions may include other functions such as averages, standard deviations, percentages, etc. For example, the values for the dimensions may be north, south, east, and west for the region dimension; shoes and shirts for the product dimension; and January, February, . . . , December for the month dimension. Then, value in the data cube cell corresponding to "sales[north][shirts][Feb]" is the total sales of shirts for the northern region for the month of February.

Dimensions frequently decompose hierarchically. For example, the hierarchical levels for the time dimension may be year, quarter, month, day, and hour. Standard implementations of multi-dimensional databases frequently support hierarchical navigation. Thus the value for the data cube cell "sales[north][shirts][First Quarter]" is the sum of the data cube cells "sales[north][shirts][January]", "sales[north][shirts][February]" and "sales[north][shirts][March]". Every cell does not need to be populated, nor do the hierarchies need to be symmetric for all dimensions.

The standard interface for understanding and manipulating data cubes is called a "pivot table" or "cross tab". Although there are variations among particular vendors' implementations, FIG. 1 shows an example of a Microsoft Excel™ pivot table. As shown in FIG. 1, in a Microsoft Excel™ pivot table. As shown in FIG. 1, in a Microsoft Excel™ pivot table 10, the cells are arranged in a "row by column by page" grid, with only one page being displayed at any time. The value of the column dimension 20 (the "product" dimension in FIG. 1), the row dimension 30 (the "state" dimension in FIG. 1), and the page dimension 40 (the "QTR" dimension in FIG. 1) are used to index the table cells and adjust the displayed page. In the pivot table 10 shown in FIG. 1, each cell contains five measures: sales 50, expenses 51, profit 52, cost of goods sold (COGS) 53, and marketing 54. For each measure, the margin 55 are totaled along the edges. The grand totals are totaled in the lower right hand corner (not shown in FIG. 1). The row dimension 20, i.e., the product dimension, is organized into a two-level hierarchy that includes a higher-level "product_type" dimension 21 and the low-level "product" dimension 22 nested within the "product_type" dimension 21.

Pivot tables are implemented as interactive textual reports, i.e., textual reports that can be manipulated. Standard pivot table manipulations include assigning dimensions to the rows, columns, and pages using menus, tool bars, and wizards; navigating hierarchical dimensions by collapsing or expanding the hierarchies; and aggregating results across different dimensions.

Trellis displays, as disclosed in "The design and control of trellis display", W. S. Cleveland et al., Journal of Computational and Statistical Graphics, 5:123–155, 1996, extends the small multiples disclosed in *The Visual Display of Quantitative Information*, E. R. Tufte, Graphics Press, Cheshire, Conn., 1983, by arranging sequences of tiled panels arranged in rows and columns. In some cases, the tiles may span multiple pages. When applied to show slices of multi-dimensional data with the dimensions controlling the row, column, and page in the layout, Trellis displays are particularly useful for discovering interactions among the measures. However, using Trellis displays to study cubes, while promising, frequently results in tens to hundreds of pages of printed graphs that must be manually studied.

SUMMARY OF THE INVENTION

Unfortunately, pivot table reports are hard to understand, particularly for large tables. For example, after carefully reviewing the pivot table shown in FIG. 1, even if the font were readable, about the only thing that could be determined is that certain products are not sold in certain states. Users usually find it difficult, if not impossible, to see patterns, discover trends, identify what changed from quarter to quarter, and/or find relationships between various measures. Seemingly simple analysis tasks, such as identifying the three largest cells, locating the two rows with the smallest totals, or finding the biggest growth trends, are time consuming and tedious.

Accordingly, various exemplary embodiments of the multi-dimensional data visualization systems and methods according to this invention provide a number of tools for visual discovery in multi-dimensional data structures such as pivot tables. Each of the tools of the multi-dimensional data visualization systems and methods according to this invention target different aspects of visual analysis and discovery.

In various exemplary embodiments of the multi-dimensional data visualization systems and methods according to this invention, these tools are organized into a number of different perspectives. A perspective is a set of linked visual components, or "views", that are displayed together on the same graphical user interface screen. The views in a perspective work together to enable a particular type of visual analysis. One such perspective focuses on visualizing a single measure over an entire pivot table or other multi-dimensional data structure. Another perspective shows two measures simultaneously.

These and other features and advantages of this invention are described in or are apparent from the following detailed description of various exemplary embodiments of the systems and methods according to this invention.

BRIEF DESCRIPTION OF THE DRAWINGS

The patent or application filed contains at least one drawing executed in color. Copies of this patent or patent application publication with colored drawings will be provided by the U.S. Patent and Trademark Office upon request and payment of the necessary fee.

Various exemplary embodiments of this invention will be described in detail, with reference to the following figures, wherein.

DETAILED DESCRIPTION OF PREFERRED EMBODIMENTS

Figure 1:
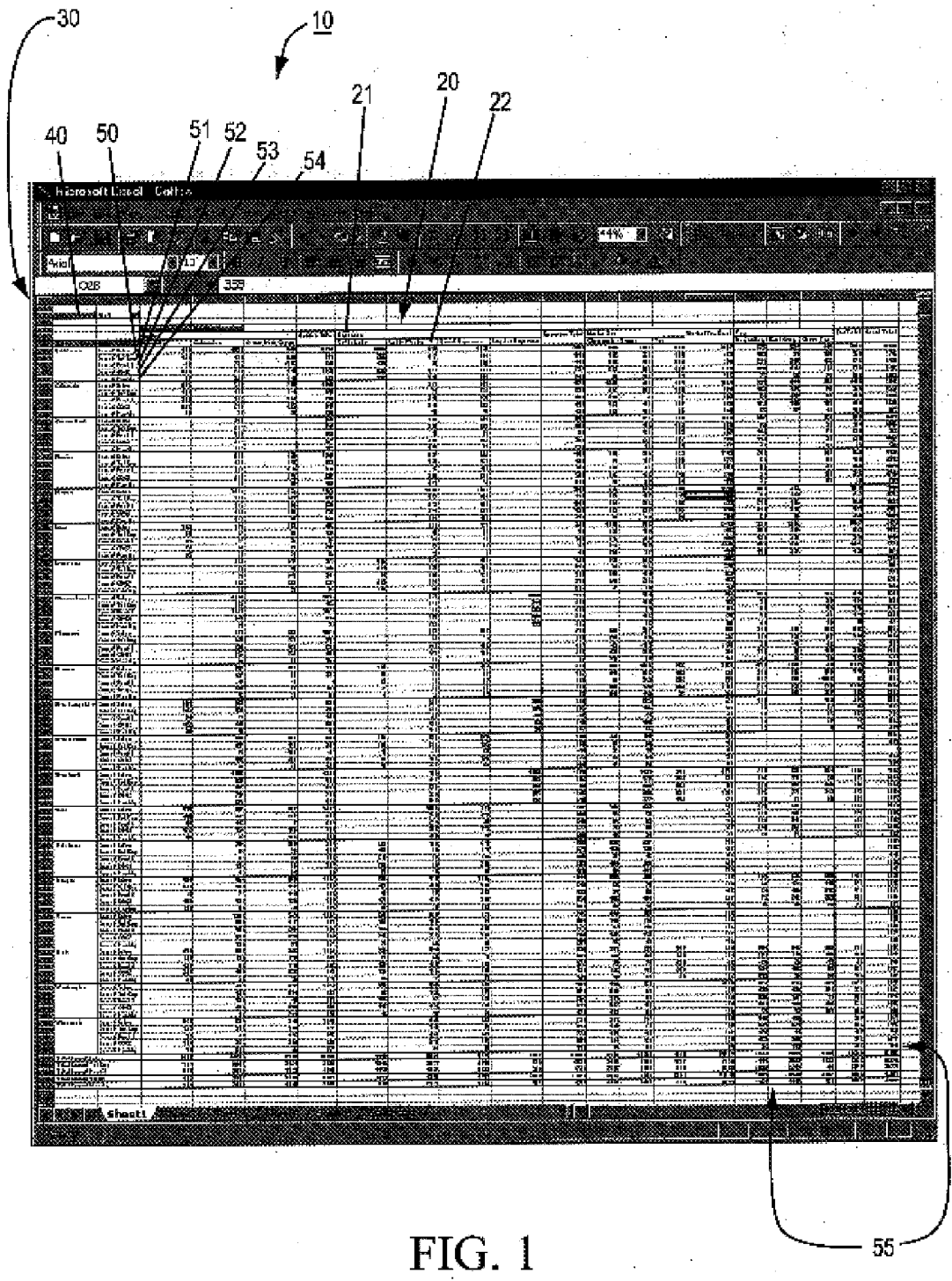
FIG. 1 is an exemplary Microsoft Excel™ pivot table.

The following detailed description of various exemplary embodiments of the data visualization systems and methods according to this invention are based on the Microsoft Excel 2000™ and Office 2000™ software applications or platforms. However, those of ordinary skill in the art will generally recognize how to apply the data visualization systems and methods according to this invention to other multi-dimensional data structures. Thus, it should be appreciated that the data visualization systems and methods according to this invention do not require Microsoft Excel 2000™ and Office 2000™ data structures.

Dimensional databases are a particularly useful way to organize business metrics. Multi-dimensional data structures, including pivot tables, are the most widely used tool for manipulating and reporting on these metrics. However, it is difficult for users to understand and make sense of pivot table data, such as, for example, to see patterns, to identify trends, and to spot outliers, because of the size and textual nature of pivot tables and other multi-dimensional data structures. Often, understanding even a tiny 10 row by 10 column pivot table is difficult, and understanding bigger pivot tables is impossible. Graphical tools supplied by the vendors of such multi-dimensional data structures, such as Microsoft, are generally not scaleable and often not particularly useful.

Accordingly, in practice, the way users conventionally understand large pivot tables is by breaking them up into multiple small tables. Unfortunately, there are three disadvantage in using smaller, reduced-size pivot tables. First, aggregations mask important details. Second, subsets obscure overall patterns. Third, predefined comparisons prevent users from discovering unexpected and unanticipated results.

The multi-dimensional data visualization systems and methods according to this invention address these problems using a number of different data visualization techniques. In particular, a "single measure" perspective provides an overview of an entire pivot table showing overall patterns, by including at least one view displaying data for only a single measure. One or more multi-measure perspectives, such as a "multiple measures" perspective and an "anchored measures" perspective, allow a user to discern those items containing unusually high or low measures, by including at least one view displaying data for two or more measures.

By interactively selecting and labeling the largest bars, both in the positive and negative directions, extreme values can be highlighted. Row and column bar chart views, as well as a three-dimensional multiscape view, can be easily sorted for easy comparison and comprehension. The row and column dimensional bar chart views show margin totals. By tying color to either a dimension or a measure, the information-carrying capacity of the visual display increases.

By visually manipulating the row, column, and page dimensions, navigation through the pivot table is facilitated. The anchored measures and multiple measures perspectives according to this invention provide unique and novel ways to visualize several measures simultaneously. These perspectives enable users to discover interactions among several measures. By interactively selecting important regions of the data and focusing in on those selected regions by excluding unselected data, users are able to see details within context.

The multi-dimensional data visualization systems and methods according to this invention also provide a toolbar that provides a rich selection mechanism, making it possible, for example, to focus in on arbitrary regions of a pivot table. When connected directly to a multi-dimensional database engine, the multi-dimensional data visualization systems and methods according to this invention provides users with the ability to access sub-cell detailed data.

Real analysis sessions include both visual analysis and textual analysis. Using the multi-dimensional data visualization systems and methods according to this invention, users can visually select significant subsets of the multi-dimensional data structure, e.g., regions where a particular product is not profitable, and export the subset back to the data source as a new multi-dimensional data structure for further textual and/or visual analysis.

Thus, using the multi-dimensional data visualization systems and methods according to this invention, users are able to easily analyze pivot tables, or other multi-dimensional data structures, having several hundred rows and columns, eliminating the need to decompose a cube into sets of sub-cubes.

Figure 2:
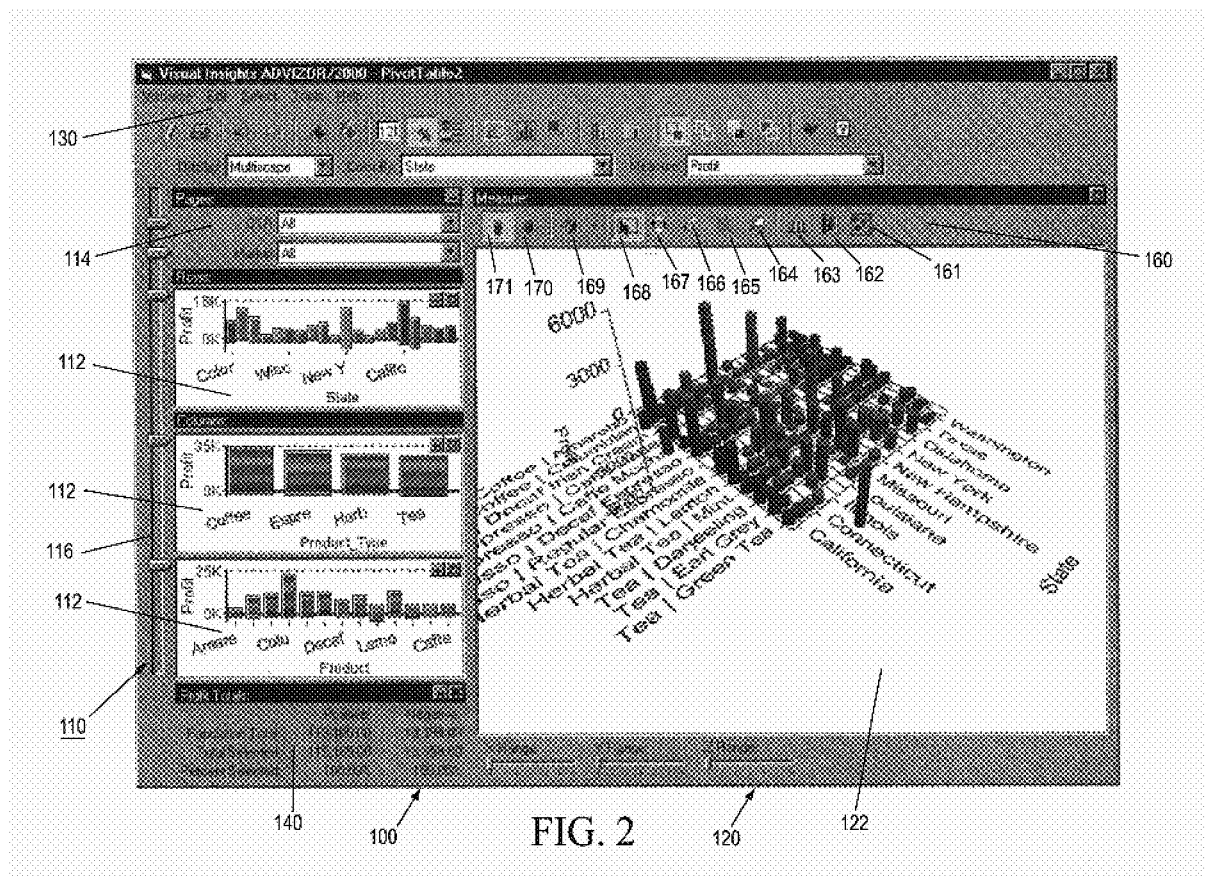
FIG. 2 is one exemplary embodiment of a single measure perspective according to this invention.

FIG. 2 shows one exemplary embodiment of a single measure perspective 100 according to this invention. The single measure perspective is used to visualize the pivot table shown in FIG. 1. The data visualization systems and methods of this invention are able to read the pivot table data directly from an Excel™ worksheet. The single measure perspective presents the entire pivot table for a selected measure. The pivot table data is flattened to 2 dimensions and is used as input data to the single measure perspective shown in FIG. 2. In the exemplary embodiment of the single measure perspective, which uses a three-dimensional multiscape view, the dimensions of the cube, or pivot table, are used as the X and Y axes for the three-dimensional multiscape view. The measure, i.e., the quantity displayed at the intersection of the dimensions, is used as the value/weight of the glyphs that extend along the Z axis. The weight determines the size of the glyphs.

In the exemplary embodiment of the single measure perspective shown in FIG. 2, the measure "profits" is visualized. However, it should be appreciated that the single measure perspective according to this invention can be used to visualize any measure contained in the particular pivot table being visualized. Additionally, as discussed in greater detail below, the particular measure being visualized in the single measure perspective can be switched at will by the user between any measure contained in the particular pivot table being visualized.

As shown in FIG. 2, the single measure perspective according to this invention is displayed using a standard graphical user interface that is organized into a number of portions. These portions can include a toolbar 130, a dimensional view portion 110, a single measure view portion 120 and an optional totals table portion 140. The toolbar extends across the top of the exemplary embodiment of the single measure perspective shown in FIG. 2. However, it should be appreciated that the toolbar can be located anywhere in the graphical user interface. The various control functions implemented in the toolbar are discussed below in greater detail with respect to FIG. 7. The various drop-down and pop-up menus and buttons used to implement this toolbar follow the standard Microsoft conventions.

The dimensional view portion 110 includes one or more interactive dimensional views 112. In the exemplary embodiment of the single measure perspective shown in FIG. 2, the dimensional view portion is implemented as a bar chart view portion. The exemplary embodiment of the bar chart view portion shown in FIG. 2 includes three interactive bar chart views that are positioned along the left edge of the graphical user interface. In particular, in the exemplary embodiment of the single measure perspective shown in FIG. 2, one dimensional view is displayed in the dimensional view portion for each dimension of the selected measure. For the profit measure of the pivot table shown in FIG. 1, these dimensions include product_type, product and state. Thus, the three dimensional views show the profits totaled by product_type, by product, and by state, respectively. The dimensional view portion of the exemplary embodiments of the single measure and multiple measures perspectives shown in FIGS. 2 and 4 can also include a pages portion 114 that includes a page combo box that allows the user to select the page of data to be displayed. The dimensional view portion also includes a slider bar portion 116 that allows the user to move, add or remove various dimensional views from the dimensional view portion and various drop-down menus from the page combo box of the pages portion.

Figure 3:
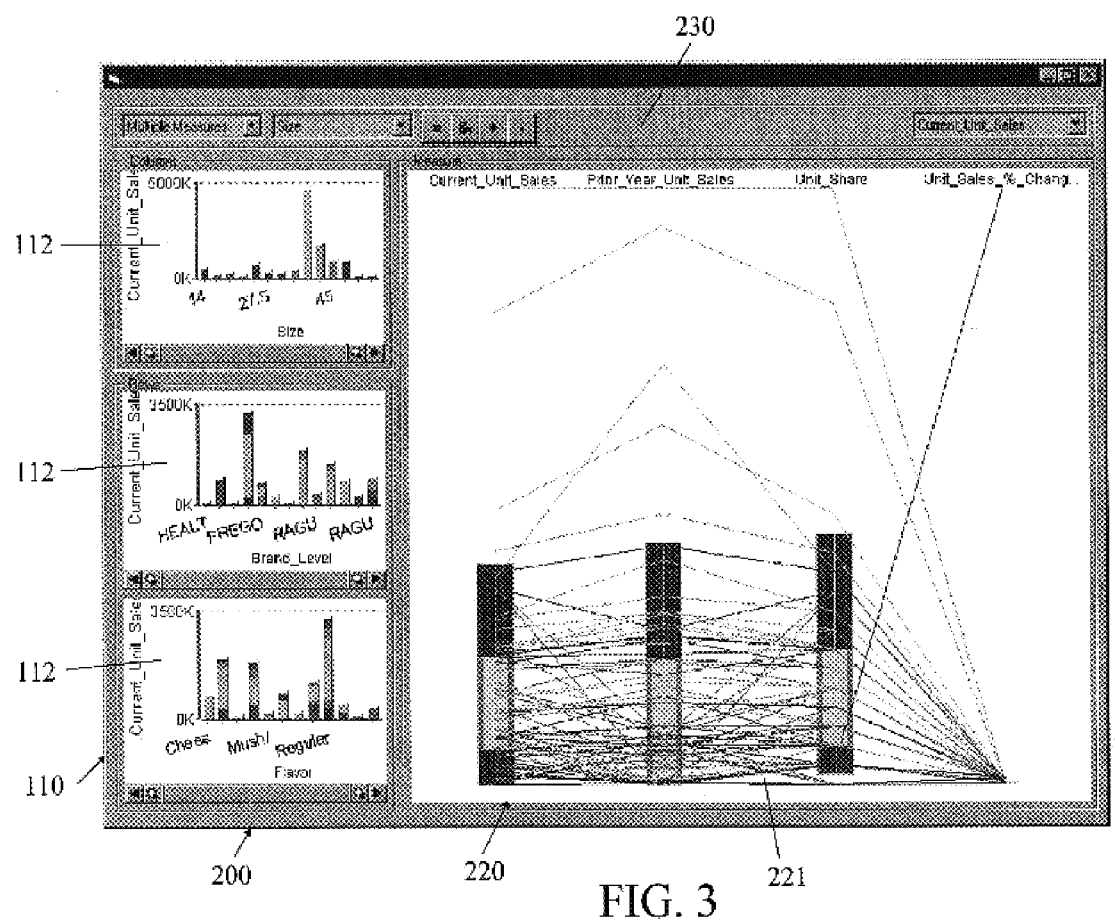
FIG. 3 is a first exemplary embodiment of a multiple measures perspective according to this invention.
Figure 4:
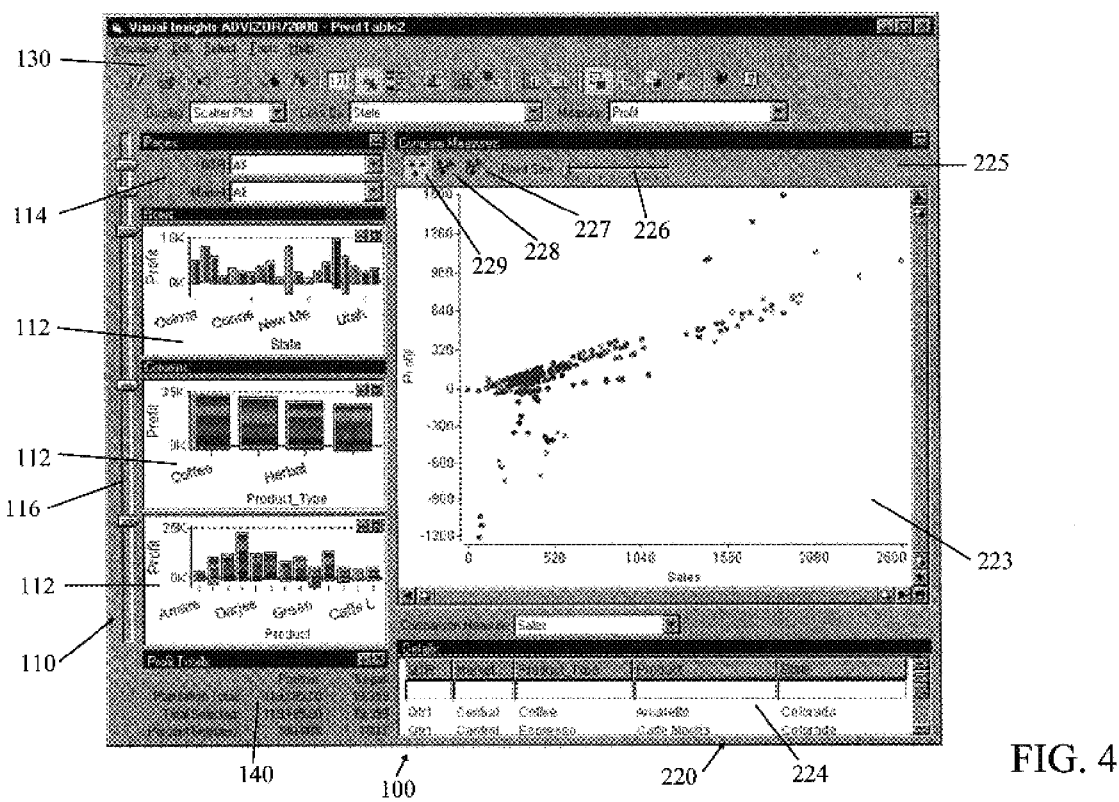
FIG. 4 is a second exemplary embodiment of the multiple measures perspective according to this invention.

In the exemplary embodiments of the single measure and multiple measures perspectives shown in FIGS. 2–4, the dimensional views are bar chart views. However, it should be appreciated that any graphical representation of aggregated data on a dimensional basis can be used in the dimensional view portion in place of the bar chart views shown in FIGS. 2–4. For example, another common dimensional view is the pie chart view (not shown). Other types of dimensional views include line charts, hierarchical charts, bubble plots, and the like.

It should be appreciated that, if the particular dimension being visualized has more or fewer measures, the number of dimensional views in the dimensional view portion will change to correspond to the number of measures that the selected dimension has. Moreover, it should further be appreciated that the dimensional view portion can be manipulated by the user to hide various dimensions, as discussed in greater detail below.

In the exemplary embodiment of the single measure perspective shown in FIG. 2, the single measure view portion includes a three-dimensional landscape view, called a three-dimensional multiscape view. However, it should be appreciated that any known or later developed view that allows all of the data of a single measure to be visualized at the same time can be used in the single measure view portion. In the exemplary embodiment of the single measure perspective shown in FIG. 2, the multiscape view of the single measure view portion is positioned in the center of the graphical user interface. For the profit measure of the pivot table shown in FIG. 1, the multiscape view in FIG. 2 shows the profit by a product-state combination. Thus, the height, or depth for negative values, of each multiscape glyph along the z-axis represents the profits, or losses, respectively, for a particular product within a particular state. The products are arranged along the x (or y) axis grouped by product_type.

In the exemplary embodiment of the single measure perspective shown in FIG. 2, the totals table portion is positioned at the bottom left hand corner, and contains a totals table. For the measure currently displayed, such as, for example, profit in the exemplary embodiment of the single measure perspective shown in FIG. 2, the totals table shows the sum of that measure for all data items in the data pool, the sum of that measure for the selected items and the percent of the entire data set that is selected. Some measures can have both positive and negative values. In this exemplary embodiment of the totals table, the data items with positive values are separated from the data items with negative values. Similarly, the data items with positive values are summed separately from the data items with negative values and the positive and negative data items are listed separately under the corresponding positive and negative columns.

The dimensional views present pivot table marginal totals, such as, for example in FIG. 2, the aggregation of profits by dimension value. In contrast, the multiscape view shows the cell detail. Moreover, the multiscape view gives the "big picture" overview of the pivot table. In the single measure perspective according to this invention, the dimensional views according to this invention have two purposes. First, the dimensional views give summarized detail about the values of the dimensions. Second, the dimensional views act as filters in the visual analysis process. This is discussed in more detail below.

As shown in FIG. 2, the multiscape view also includes its own toolbar 160. This toolbar includes, from the right end, a "top-down/bottom-up view" button 161, a "horizontal view" button 162, a "home position view" button 163, a "zoom" button 164, a "horizontal rotation" button 165, a "arbitrary rotation" button 166, a "pan" button 167, a "select mode selection" button 168, a "resort rows/columns" button 169, a "blocks" button 170 and a "cylinder" button 171. The "top-down view" button changes the orientation of the three-dimensional multiscape views smoothly from the current orientation to an orientation where it appears the user is looking down or looking up along the vertical axis. The "horizontal view" button changes the orientation of the three-dimensional multiscape views smoothly from the current orientation to an orientation where it appears that the user is looking at the three-dimensional multiscape view along the horizontal plane. The "home position" button returns the orientation of the three-dimensional multiscape view from its current position to the home orientation and zoom shown in FIG. 2.

The zoom button provides the standard zoom function. The "horizontal rotation" button places the three-dimensional multiscape view into the horizontal orientation and then rotates the three-dimensional multiscape view about an axis that is parallel to the vertical axis but which passes through the center of the horizontal plane of the three-dimensional multiscape view. The "arbitrary rotation" button allows the user to arbitrarily rotate the three-dimensional multiscape view about an arbitrary axis, by linking the direction and amount of movement of the mouse to the rotational axis and the amount of rotation of the three-dimensional multiscape view.

The "pan" button allows the user to pan the three-dimensional multiscape view left, right, up and down using its current orientation. The "select mode selection" button returns the mouse to a selection mode to allow the user to select a portion of the three-dimensional multiscape view. The "re-sort rows/columns" button allows the user to alter which dimensions are associated with each axis of the three-dimensional multiscape view.

The "blocks" button and the "cylinder" button allow the user to covert the displayed shapes of the glyphs representing the values of the measure for the various dimensions between a cylindrical shape and a rectangular prism shape.

Figure 5:
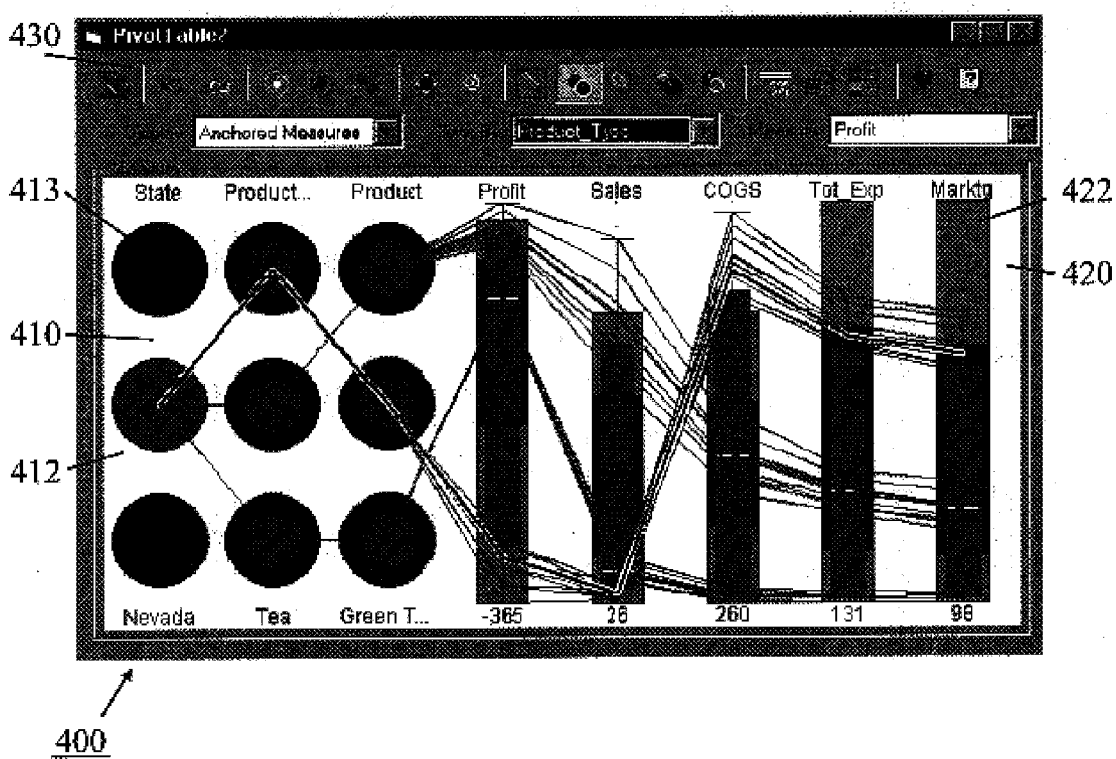
FIG. 5 is one exemplary embodiment of an anchored measures perspective according to this invention.

FIGS. 3 and 4 show a first exemplary embodiment 200 and a second exemplary embodiment 300, respectively, of a multiple measures perspective according to this invention that is usable to visualize the pivot table shown in FIG. 1. FIG. 5 shows one exemplary embodiment of an anchored measures perspective according to this invention usable to visualize the pivot table shown in FIG. 1.

The multiple measures perspectives 200 and 300 shown in FIGS. 2 and 4 include the dimensional view portion of the single measure perspective but replaces the single measure view portion of the single measure perspective with a measures view portion 220 that includes a view that is able to display several measures simultaneously. For example, the first exemplary embodiment of the multiple measures perspective shown in FIG. 3 includes a parabox view portion 221 as the measures view portion, while the second exemplary embodiment of the multiple measures perspective shown in FIG. 4 includes a scatterplot view portion 223 as the measures view portion. The parabox view is described in detail in co-pending U.S. Pat. No. 6,356,285, filed Dec. 17, 1997, herein incorporated by reference in its entirety. However, it should be appreciated that any know or later developed view that that allows data of two or more measures to be visualized at the same time can be used in the measures view portion.

In particular, relative to the single measure perspective shown in FIG. 2, the multiple measures perspective shown in FIG. 3 replaces the multiscape view with a weighted parabox view. The weighted parabox view combines a box plot view and a parallel coordinate view representation to show several measures simultaneously. In various exemplary embodiments according to this invention, the parallel coordinates view is implemented as a series of lines extending between the box plots of the box plot view portion.

The first exemplary embodiment of the multiple measures perspective shown in FIG. 3 does not include the totals table portion. The first exemplary embodiment of the multiple measures perspective shown in FIG. 3 also uses a second exemplary embodiment of the dimensional view portion that does not include the page combo box portion or the slider bar portion. Finally, the first exemplary embodiment of the multiple measures perspective shown in FIG. 3 replaces the toolbar 130 used in the single measure perspective shown in FIG. 2 and the second exemplary embodiment of the multiple measures perspective shown in FIG. 4 with a second exemplary embodiment of a toolbar 230.

Alternatively, relative to the exemplary embodiment of the single measure perspective shown in FIG. 2, the second exemplary embodiment of the multiple measures perspective shown in FIG. 4 replaces the multiscape view in the single measure view portion 120 with a measures view portion 220 that includes the scatterplot view portion 223 and adds a data sheet portion 224 and a measures toolbar 225. The scatterplot view shows exactly two measures simultaneously. Showing two measures simultaneously highlights interactions between the visualized measures that may lead to answers about why a certain problem exists.

The measures toolbar 225 includes a point size slider bar 226, a spline line mode button 227, a straight line mode button 228 and a no line mode button 229. In the second exemplary embodiment of the multiple measures perspective shown in FIG. 4, the no line mode is active. The point size slider bar allows the user to control the displayed size of the points in the scatterplot. The spline line mode, when active, draws a second-order or higher line that most appropriately fits the selected data points within the scatterplot. The straight line mode, when active, draws a first-order, or straight, line that most appropriately fits the selected data points within the scatterplot. As shown in FIG. 4, when the no line mode is active, no lines are drawn through the selected data points within the scatterplot.

In contrast to the second exemplary embodiment of the multiple measures perspective 300 shown in FIG. 4, relative to the single-measures perspective shown in FIG. 2 and the first exemplary embodiment of the multiple measures perspective shown in FIG. 3, the anchored measure perspective 400 shown in FIG. 5 replaces the dimensional view portion 110 with a second exemplary embodiment of the dimensional view portion 410. This second exemplary embodiment of the dimensional view portion 410 is combined with, and thus extends, the parabox view 422 of a parabox view portion 420 so that the combined view is able to handle both continuous data, using the box plots view of the parabox view 422, and categorical data, using a bubble plot view 412 in the dimensional view portion 410. The bubble plot view includes one column 413 of bubble plots for each dimension.

In the anchored measure perspective shown in FIG. 5, a third exemplary embodiment 430 of the toolbar is located above the parabox view portion 420. However, it should be appreciated that the toolbar can be located anywhere in the graphical user interface. The various control functions implemented in the toolbar are discussed below in greater detail with respect to FIG. 6. Additionally, the pages portion 114 and the totals table portion 140 are omitted.

It should be appreciated that both the anchored measures perspective and the multiple measures perspective display several measures simultaneously. Showing several measures simultaneously in a single perspective allows interactions between measures to be highlighted. This in turn may lead to answers about why a certain problem exists in the system represented by the data stored in the multi-dimensional data structure being analyzed.

As shown in FIGS. 3 and 5, in the first exemplary embodiment of the multiple measures perspective and the exemplary embodiment of the anchored measures perspective according to this invention, the dimensions and measures are organized along a series of parallel axes, as with a parallel coordinates plot. In the first and second exemplary embodiments of the multiple measures perspectives shown in FIGS. 3 and 4, the dimensions are visualized using the dimensional views of the dimensional views portion. In contrast, in the anchored measures perspective, the dimensions are visualized in a bubble plot view portion of the parabox view. In both the first exemplary embodiment of the multiple measures perspective shown in FIG. 3 and the exemplary embodiment of the anchored measures perspective shown in FIG. 5, the measures are visualized in a weighted box plot view portion of the weighted parabox view.

In the first and second exemplary embodiments of the multiple measures perspective shown in FIGS. 3 and 4, the same three dimensions, state, product_type and product, which correspond to the dimensions of the original pivot table, are shown as were shown in FIG. 2. Thus, the dimensional view portions of FIGS. 3 and 4 include the same three bar chart views as in FIG. 2. In the exemplary embodiment of the anchored measures perspective shown in FIG. 5, these same three dimensions are indicated by the three vertical bubble plot axes of the bubble plot view portion. As indicated above with respect to FIG. 2, if there are more or fewer dimensions for the selected measures to be displayed in the weighted parabox portion, the dimensional view portion of the single measures perspective and the bubble plot view portion of the anchored measures perspective will include more or fewer dimensional views.

In the first exemplary embodiment of multiple measures perspective shown in FIG. 3, the lines representing the parallel coordinates view are drawn between the box plot views of the weighted parabox view to connect the measure values. In the anchored measures perspective according to this invention, the lines representing the parallel coordinates view are also drawn between the bubble plots of the bubble plot view portion and the box plot views of the box plot view portion of the weighted parabox view to connect the dimensions and the measure values.

In the first exemplary embodiment of the multiple measures perspective shown in FIG. 3 and the exemplary embodiment of the anchored measures perspective shown in FIG. 5, the outer boxes in the box plot views represent the range of values from the 5% percentile to the 95% percentile. The inner, dark gray box represents the range into which the middle 50% of the values fall, i.e. the 25th–75th percentiles. Outliers are values that are plotted outside, i.e., below or above, the outer box, i.e., below the $5^{th}$ percentile or above the 95th percentile.

Each line in the box plots shown in the exemplary embodiments of the single and anchored measures perspectives shown in FIGS. 3 and 5 represents the measure values for one cell of the multi-dimension data structure. In the anchored measures perspective shown in FIG. 5, the sizes of the bubbles in the state, product_type, and product axes of the bubble plot view portion represent the number of cells in the multi-dimension data structure that have each respective selected value. The values of the measures from each row-by-column cell of the multi-dimension data structure are plotted as points on the vertical axis of the corresponding box plot view of the box plot view portion. From the first exemplary embodiment of the multiple measures perspective shown in FIG. 3 and the anchored measures perspective shown in FIG. 5, a user can easily identify measure values that are extreme values, or "outliers", since these values are connected to extreme regions in the box plot views of the box plot view portion.

In the second exemplary embodiment of the multiple measures perspective shown in FIG. 4, the scatterplot view shows exactly two measures simultaneously. In particular, in FIG. 4, the profit and sales measures are visualized using the scatterplot view. Showing two measures simultaneously highlights interactions between the visualized measures that may lead to answers about why a certain problem exists. In the second exemplary embodiment of the multiple measures perspective shown in FIG. 4, data in the bar charts of the dimensional view portion and the corresponding points in the scatterplot view are colored using the same color.

As in the exemplary embodiment of the single measure perspective shown in FIG. 2, in the second exemplary embodiment of the multiple measures perspective shown in FIG. 4, the dimensional view portion is positioned to the left of the scatterplot view and includes a number of bar chart views. However, as indicated above with respect to the exemplary embodiment of the single measure perspective shown in FIG. 2, the dimensional view portion of the second exemplary embodiment of the multiple measures perspective shown in FIG. 4 can include any known or later developed dimensional view.

Similarly, as in the exemplary embodiment of the single measure perspective shown in FIG. 2, in the second exemplary embodiment of the multiple measures perspective shown in FIG. 4, the totals table portion is positioned in the lower left hand corner and displays positive and negative totals for the selected measure.

The main view in the second exemplary embodiment of the multiple measures perspective shown in FIG. 4 is the scatterplot view. In the second exemplary embodiment of the multiple measures perspective shown in FIG. 4, the user selects the measures that will be plotted on the X and Y axes of the scatterplot. Choosing different measures for the X and Y axes allows the user to compare the relationship of all available measures.

The scatterplot view is useful for visually dividing the data into quartiles. Dividing the data into quartiles allows the user to quickly discern those data items that have low X and low Y values, low X and high Y values, high X and low Y values, and high X and high Y values. For example, if the profit measure and the sales measure are plotted, the user can easily see which products have low profits and low sales, which is generally to be avoided. These items can then be selected for further analysis. The scatterplot view is also useful for identifying clusters of points and outliers and for analyzing correlations between different measures.

The data sheet portion is used in the second exemplary embodiment of the multiple measures perspective shown in FIG. 4 to display a list of detailed information about selected points within the scatterplot view. The information for the point that is currently in focus appears in the top line, or the "focus line" on the data sheet portion. The remainder of the data sheet portion lists the detailed information for all other points that are selected in the scatterplot view.

In the exemplary embodiment of the anchored measures perspective shown in FIG. 5, four base measures, "profit", "sales", "COGS" (cost of goods sold), and "marktg" (marketing), and "tot_exp" (total expenses) are visualized in the weighted parabox view. In the first exemplary embodiment of the multiple measures perspective shown in FIG. 3, the lines extending between the box plot views are colored by product_type. Similarly, in the exemplary embodiment of the anchored measures perspective shown in FIG. 5, the lines extending between the bubble plot view and the box plot views are colored by product_type.

For example, for the exemplary set of data represented by the bubble plot views and box plot views shown in the exemplary embodiment of the anchored measures perspective shown in FIG. 5, the red lines corresponding to monthly green tea purchases in Nevada show losses in profit, i.e., negative profits, since these red lines touch the bottom of the Profit box plot. By noticing the values of the other measures connected by these red lines, a user can easily tell that the reasons for losses are: low sales, high cost of goods sold, and high marketing costs.

Figure 6:
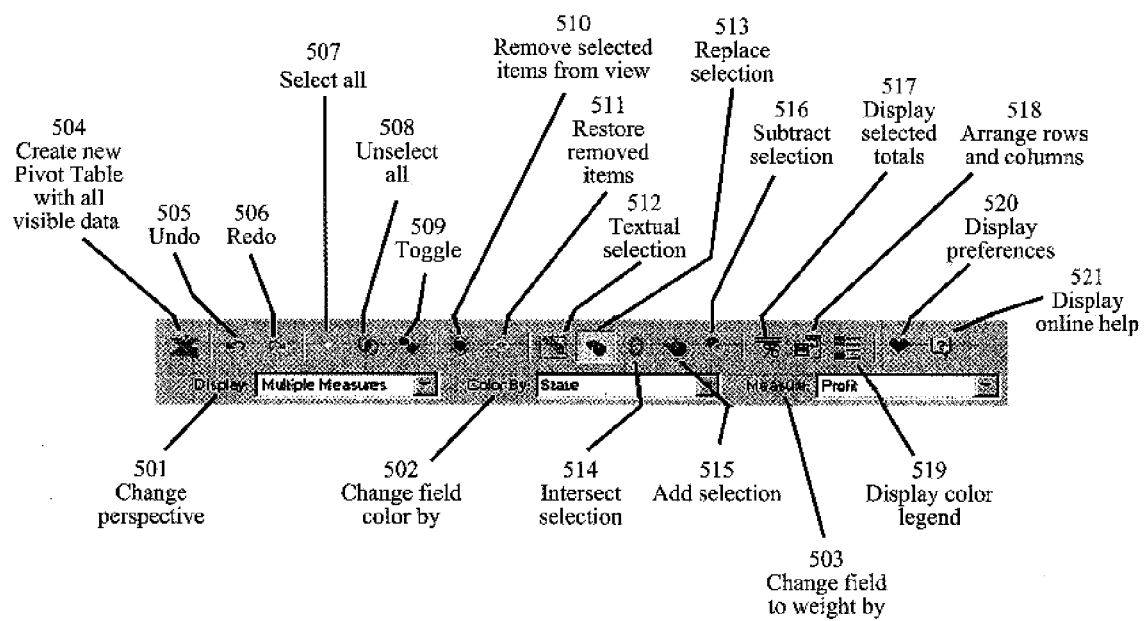
FIG. 6 is a first exemplary embodiment of a navigation toolbar according to this invention that is usable to navigate through data cubes and the various perspectives according to this invention.
Figure 7:
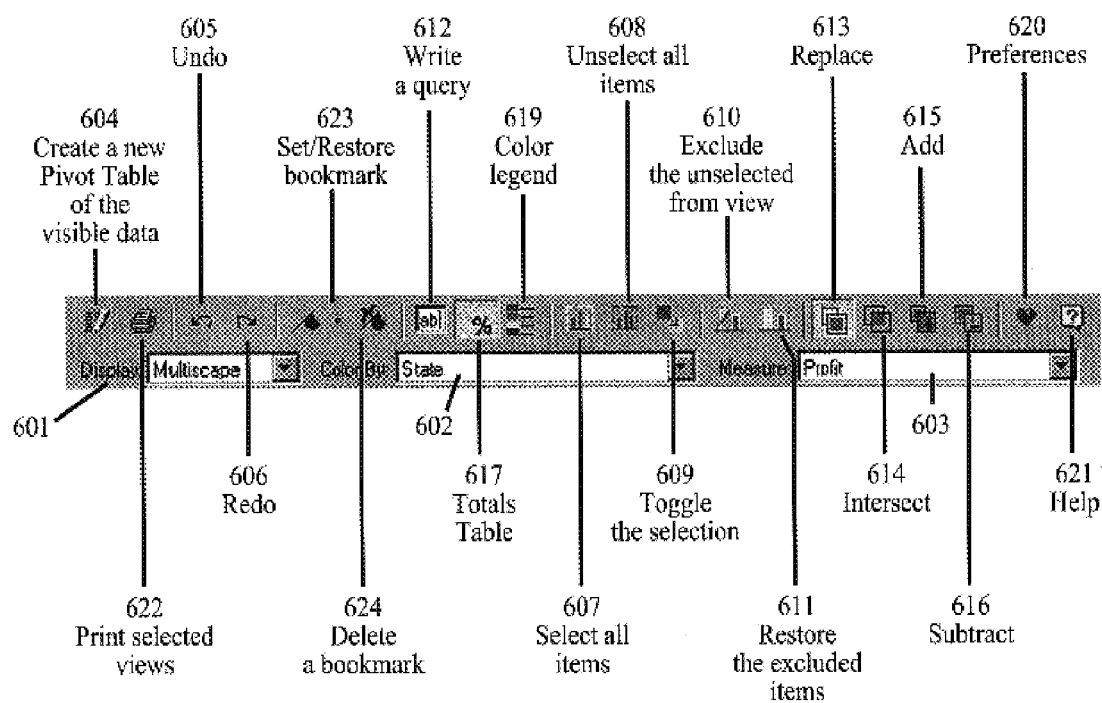
FIG. 7 is a second exemplary embodiment of a navigation toolbar according to this invention that is usable to navigate through data cubes and the various perspectives according to this invention.

FIGS. 6 and 7 show the exemplary embodiments 430 and 130, respectively, of the toolbar for controlling the single measure, multiple measure and anchored measures perspectives and the data visualization systems and methods according to this invention. In particular, the exemplary embodiment of the toolbar 430 shown in FIG. 6 is particularly useful with the exemplary embodiments of the single measure perspective shown in FIGS. 8, 9 and 10, the exemplary embodiments of the anchored measures perspectives shown in FIG. 5 and the exemplary embodiment of the multiple measures perspective shown in FIG. 3. In contrast, the exemplary embodiment of the toolbar 130 shown in FIG. 7 is particularly useful with the exemplary embodiment of the single measure perspective shown in FIG. 2, and the exemplary embodiment of the multiple measures perspective shown in FIG. 4.

The analysis power of the single measure, multiple measure and anchored measures perspective is increased by providing efficient techniques to navigate through the visualization systems and methods. The navigational tool bar shown in FIG. 6 serves as a command and control center for navigating pivot tables and other multi-dimensional data structures.

The first and second exemplary embodiments of the toolbar shown in FIGS. 6 and 7 also include a number of graphical user interface menu items usable with the data visualization systems and methods according to this invention. In various exemplary embodiments, the graphical user interface menu items of the navigational tool bar shown in FIG. 6 are implemented using Visual Basic composite control within a Visual Basic form so that the various perspectives shown in FIGS. 2–5 can be launched from Excel™ (or from any other application, for that matter). Similarly, any other known or later developed language usable to implement a graphical user interface could be used to implement the graphical user interface menu items and buttons discussed herein.

Using the left-most drop-down menu, the user will be able to switch between the single measure, multiple measure and/or anchored measures perspectives. The second drop-down menu allows the user to easily change the variable by which all the perspectives are colored by. The dimensions and measures available for coloring are those available from the pivot table data. The drop-down menu to the far right in FIG. 6 allows the user to select the measure that will be displayed in the multiscape. It should be appreciated that, in all the other views except the anchored measures perspective, this translates to the variable by which the view will be weighted.

Arranged across the top of the exemplary embodiment of the toolbar 430 shown in FIG. 6 are a displayed perspective drop-down menu 501, a color-by drop-down menu 502 and a displayed measure drop-down menu 503.

Arranged across the top of the exemplary embodiment of the toolbar 430 shown in FIG. 6 are, from left to right, a "write-back" button 504, "undo" and "redo" buttons 505 and 506, "select all", "unselect all" and "toggle" selection mode buttons 507–509, "remove" and "restore" buttons 510 and 511 for removing or restoring the selected items from the perspectives, "text query", "replace", "intersect", "add" and "subtract" selection mode buttons 512–516, a "display selected totals" button 517, an "arrange rows and columns" button 518, a "display color legend" button 519, a "display preferences" button 520 and an "online help" button 521. For example, the "arrange rows and columns" button allows the user to rearrange how the dimensions are grouped and displayed on the axes of the multiscape. The functions provided by these buttons are described in greater detail below.

Arranged across the top of the exemplary embodiment of the toolbar 130 shown in FIG. 7 are a displayed perspective drop-down menu 601, a color-by drop-down menu 602 and a displayed measure drop-down menu 603.

Arranged across the top of the second exemplary embodiment of the toolbar shown in FIG. 7 are, from left to right, a "writeback" button 604, a "print" button 622, "undo" and "redo" buttons 605 and 606, "set/restore bookmark" and "delete bookmark" buttons 623 and 624, a "textual query" selection mode button 612; a "display totals table" button 617, a "display color legend" button 619, "select all", "unselect all", and "toggle" selection mode buttons 607–609, "exclude unselected" and "restore excluded" buttons 610 and 611 for excluding unselected portions from the displayed perspectives and for restoring the excluded portions to the displayed perspectives, "replace", "intersect", "add", and "subtract" selection mode buttons 613–616, a "display preferences" button 620 and an "online help" button 621.

It should be appreciated that essentially all of the features enabled by the toolbar buttons provided on the toolbars shown in FIGS. 6 and 7 can also be invoked via dropdown menus provided above the toolbar.

It should also be appreciated that all the inherent features and capabilities of the multiscape, parabox and bar chart components, as disclosed above or in the incorporated 408 application, are available to the user through respective pop-up menus accessed by inputting an appropriate user selection input. For example, one method for inputting an appropriate user selection input comprises placing a pointer within one of the multiscape, parabox or bar chart components using a mouse as a selection device, and then clicking the secondary button (which is usually the right mouse button on a right-handed mouse) on the mouse.

In particular, the exemplary embodiments of the toolbar shown in FIGS. 6 and 7 include three classes of navigational controls. These navigational controls are directed, respectively, to controlling the displayed perspective, controlling how the perspectives are colored, controlling the measure displayed in the various perspectives. Additionally, the exemplary embodiment of the toolbar 130 shown in FIG. 6 includes a fourth class of navigational controls that controls how the dimensions of the pivot table are arranged. The "Display" controls 501 and 601 allow the user to select how the multi-dimensional data structure is shown, either as a single measure perspective, a multiple measures perspective, an anchored measures perspective or any other implemented perspective. The "Color By" controls 502 and 602 allow the user to select which dimension or measure is used to color all the views, i.e., the dimensional view, the multiscape view, the scatterplot view, the bubble plot views and/or the box plot views, or any other implemented view. The "Measure" controls 503 and 603 allow the user to set or select the displayed measure or measures, such as the measure displayed in the single measure perspective and the measures displayed in the scatterplot view of the multiple measures perspective. The pivot table dimensional arrangement control 518, described below, manipulate the rows and columns of the multi-dimensional data structure being analyzed.

The toolbars shown in FIGS. 6 and 7 also include a number of function controls, including those for selection and visibility, which allow the user to focus and drill into interesting parts of the multi-dimensional data structure. The "write-back" function controls 504 and 604 allow the user to export a "result set" back to the data source application, such as Microsoft Excel™. The result set results from the user's analysis of the multi-dimensional data structure and is a multi-dimensional data structure itself. This is described in greater detail below.

Using a mouse or any other known or later developed selection device, a user may sweep out regions on the views. The items in the swept-out region become the selection set and are drawn in color. The unselected items are then redrawn in gray. There are four selection modes, "replace", "intersect", "add" and "subtract". The "replace" selection mode is the default mode and causes the new selection set to replace the previous selection set. The "intersect" selection mode combines the previous and current selection sets to form a new, necessarily smaller set. The "add" selection mode extends the previous selection set by forming a new effective selection set as a union with the previous selection set and the new selection set. The "subtract" selection mode removes the swept out region from the previous selection set.

In addition, since selection is so important, these modes are extended in the toolbar according to this invention by adding three new selection modes, a "select all" selection mode, an "unselect all" selection mode and a "toggle" selection mode. The "select all" selection mode causes all entities to be selected. The "unselect all" selection mode causes all entities to be unselected. The "toggle" selection mode inverts the selection set. That is, in the "toggle" selection mode, those items that were previously selected become unselected, while those items that were previously unselected become selected.

Furthermore, because selection is so important, these modes are further extended in the toolbar according to this invention by adding the "text" or "textual selection" selection mode buttons and functions 512 and 612. When the user selects the "text" button, a text string measure selection graphical user interface that is usable with the data visualization systems and methods according to this invention is displayed. That is, after the user selects the "text" button from the toolbar, the user is provided with a method of data selection that is based on the value of a text string rather than the area swept by the mouse or other selection device. A text selection dialogue box of this graphical user interface allows the user to enter the selection mode, using a first drop down box, the measure from which to choose, using a second drop down box, and the condition and value for matching, using 3rd and 4th drop down boxes. In response, the currently displayed views will change such that only the data items matching the criteria stated in the "measure selection" box are selected. All other values will be unselected.

The "display totals table" buttons 517 and 617 cause the measure totals table section 140 that is usable with the data visualization systems and methods according to this invention to be displayed. In the exemplary embodiments shown in FIGS. 2 and 4, the totals table section is positioned below the dimensional views portion. The measure totals dialog box displays the sum of the measure that is selected and as a percentage of the entire data set. These values are dynamically updated as the user selects different portions of data.

As indicated above, in embodiments that use the toolbar 430, selecting the "arrange rows and columns" button 518 allows the user to rearrange the dimensional views, by causing one or more dimension views to be rearranged within the graphical user interfaces that are usable with the data visualization systems and methods according to this invention. To add, remove, and rearrange the dimensional views shown in the various perspectives, in the single measure perspective, the available dimensions are listed in the displayed graphical user interface. If all dimensions are currently displayed in the perspective, all dimensions are listed in "columns", "rows", or "pages" sections. In the multiple measure perspective, the displayed dimensions are listed in a "column" section. If the visualization uses pages, then these are listed in an "available columns" section.

To add a dimension, the user drags the dimension from the dimension list section to the appropriate section where the dimension is to appear. To remove a dimension from the perspective, the user drags that dimension to the dimension list section. To rearrange the order of the dimensions, the user drags the dimension to the location where that dimension is to appear in the visualization.

As indicated above, in embodiments that use the toolbar 130, the multi-dimensional data visualization systems and methods according to this invention include a dimensional focus navigational control portion and technique 116 for manipulating the rows, columns and pages that are visualized in the various perspectives of the multi-dimensional data visualization systems and methods according to this invention. Similarly, selection and visibility allow the user of the multi-dimensional data visualization systems and methods according to this invention to focus on and drill into interesting parts of the visualized multi-dimensional data structure.

Using the dimensional focus navigational technique according to this invention, the user can rearrange the dimensions after visualizing a pivot table or other multi-dimensional data structure, by swapping rows, columns, and pages.

The various dimensions of a pivot table or other multi-dimensional data structure displayed in the various perspectives of the multi-dimensional data visualization systems and methods can be rearranged within the various perspectives in any configuration. However, at least one row and at least one column dimension of the pivot table or other multi-dimensional data structure must be selected for display, such as, for example, in the dimensional views portion. Changes to the dimensions that are made in the data visualization do not affect data stored in the original pivot table or other multi-dimensional data structure.

The slider bar along the left side of the dimensional views portion is used to move a dimension to a different location within the dimensional views portion. To rearrange the dimensions within the dimensional views portion, the user clicks on the slider corresponding to one of the dimensions and drags the corresponding slider to a new area.

For example, to change a row dimension to a column dimension, the user selects the slider of the slider bar portion 116 next to that row dimension and drags that slide to the column section. The bar chart view for that dimension moves from the row section to the column section. Simultaneously, in the exemplary embodiment of the single measure perspective, the dimensions arranged along the column and row axes of the multiscape view change to reflect the new arrangement of the dimensions. It should be appreciated that a dimension can be removed from the various perspectives by moving that dimension to the pages section 114 and ensuring that the page field of the page combo box is set to "ALL".

In the multi-dimensional data visualization systems and methods according to this invention, the user can select data in two ways; by using a mouse or other selection device, or by using a textual query. Using the mouse, the user may sweep out regions on the views. The items in the sweep out region become the selection set and are drawn in color. The unselected set is drawn in gray.

Using the "text" or "textual selection" selection mode button and function, or equivalently, using the menu selection "Select|Write a Query . . . ", the user constructs a textual query by filling in the blanks in a query box. The items matching the conditions indicated in the query become the selection set and are drawn in color. Again, the unselected set is drawn in gray.

The visual data analysis of the data visualization systems and methods according to this invention also provide the user with the ability to focus in on particular regions of interest. There are two aspects of the visibility capability implemented using the navigation toolbar according to this invention: excluding unselected data and restoring excluded data. The exclude function according to this invention eliminates the unselected data items from the graphical user interface, so that only the selected data set is visible. The restore function brings the previously excluded data items back, making them again visible on the graphical user interface. Working together, selection and exclusion are extremely powerful. Starting with a large multi-dimensional data structure, a user can quickly and easily identify unusual patterns and interactively select them. Using the exclude function, a user can easily drill-in and focus on the interesting regions of the multi-dimensional data structure.

Figure 8:
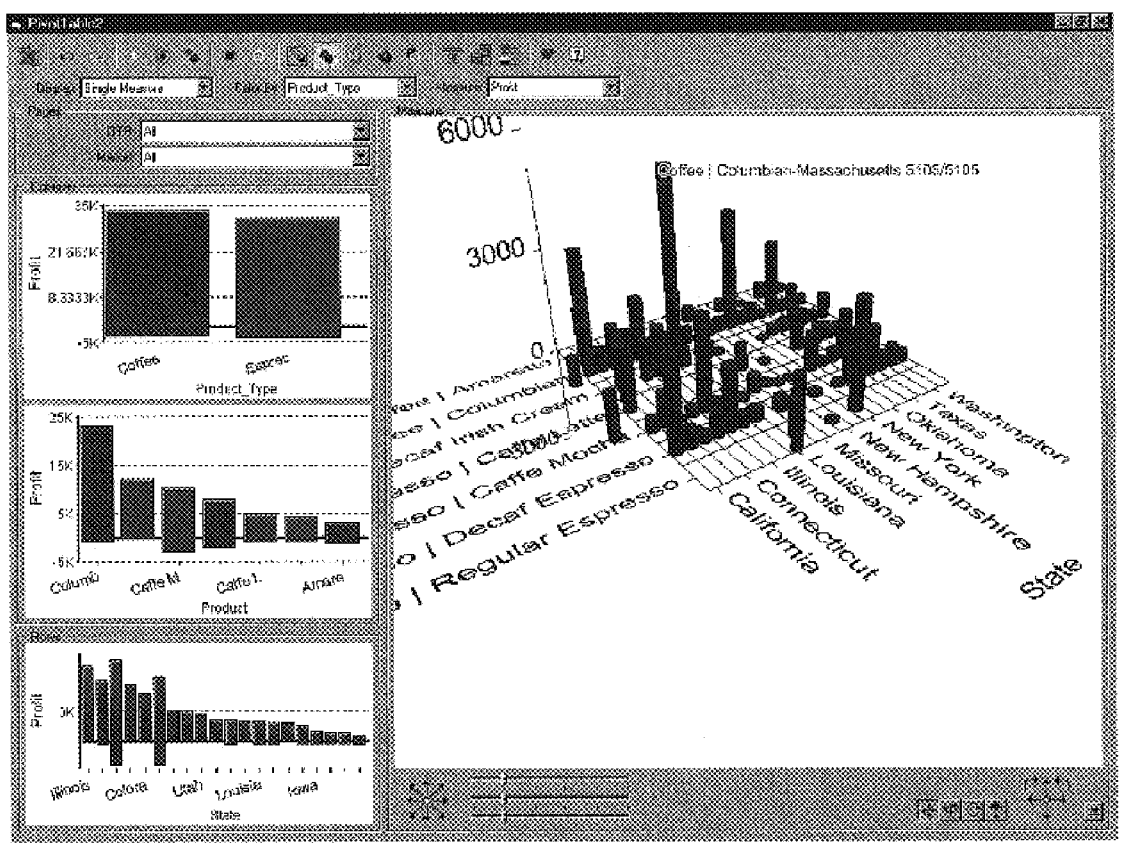
FIG. 8 illustrates the application of the "exclude" function on the exemplary single measure perspective of FIG. 2.

For example, to compare how profits vary between the products "coffee" and "espresso", a convenient strategy is to select those products and exclude the other product types. To accomplish this in the single measure perspective, the user would use the dimensional views as filtering tools. For example, in the exemplary multi-dimensional data structure displayed in the exemplary embodiment of the single measure perspective shown in FIG. 2, the user would select, on the "product_type" bar chart, just those bars corresponding to "coffee" and "espresso". Using the navigational toolbar according to this invention, pressing the "exclude" button simplifies the perspective to these two coffees. FIG. 8 shows the exemplary embodiment of the single measure perspective shown in FIG. 2 after the "exclude" button is used to exclude all but coffee and espresso. The resulting exemplary embodiment of the single measure perspective shown in FIG. 8 makes it immediately apparent that Colombian coffee is quite profitable in Massachusetts and espresso is extremely profitable in New York.

Performing visual data analysis using the data visualization systems and methods according to this invention involves posing questions, formulating hypotheses, and discovering results. As part of a holistic analysis process, these results must translate into business actions that yield value. To achieve this, various exemplary embodiments of the data visualization systems and methods according to this invention provide users with the ability not only to perform visual analysis, but to create new multi-dimensional data structures that capture the results, called a "result set", of this visual analysis. A result set, which is a sub-multi-dimensional data structure created by selecting and excluding, may be exported, or "written-back" to the data source application, such as Microsoft Excel™. The written-back result set then appears in the data source application, such as Microsoft Excel™, as a new pivot table on a new sheet.

Furthermore, since various exemplary embodiments of the data visualization systems and methods according to this invention provide the ability to integrates with Microsoft Office™, important visualizations may be inserted in Microsoft PowerPoint™ presentations, analyzed further in Microsoft Excel™, saved as "html" files and browsed using Microsoft Internet Explorer™, or distributed as text for further action.

The pivot table shown in FIG. 1 includes data representing a multi-quarter business profitability study. The complete dataset, stored as an Excel pivot table, contains a wide range of business metrics. Such a multi-quarter business profitability study could be used to study profitability by product and market, to identify profitability problems, and to highlight reasons for the problems. One particular use of such a multi-quarter business profitability study could be to maximize profitability in Nevada by adjusting the product mix.

In the master pivot table, the original dimensions included "QTR" (quarter), "months", "market", "state", "mrkt size" (market size), "product type", "product", and "decaf" (whether the product is decaffeinated). The original pivot table also included the measures "profit", "margin", "sales", "cogs" (cost of goods sold), "tot_exp" (total expenses), "marktg" (marketing), "payroll", "misc" (miscellaneous), "inventory", "opening", "additions", "ending", "margin rat" (margin ratio), "profit ratio", "bdgt_profit" (budgeted profit), "bdgt_margin" (budgeted margin), "bdgt_sales" (budgeted sales), "bdgt_cogs" (budgeted cost of goods sold), "bdgt_payroll" (budgeted payroll), "and "bdgt_additions" (budgeted additions).

Figure 9:
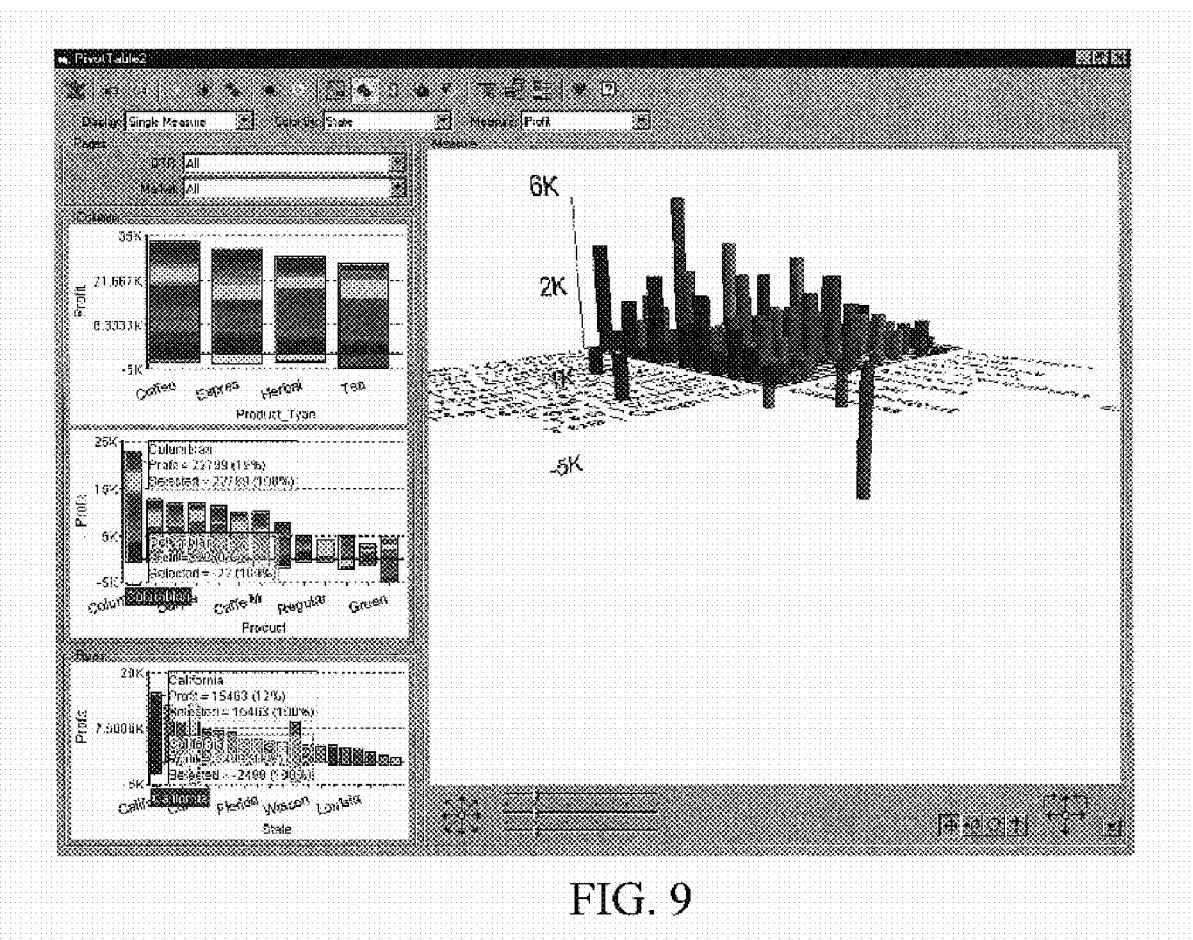
FIGS. 9 and 10 illustrate the linkage according to this invention between the bar chart views and the multiscape view in the exemplary embodiment of the single measure perspective shown in FIG. 2.
Figure 10:
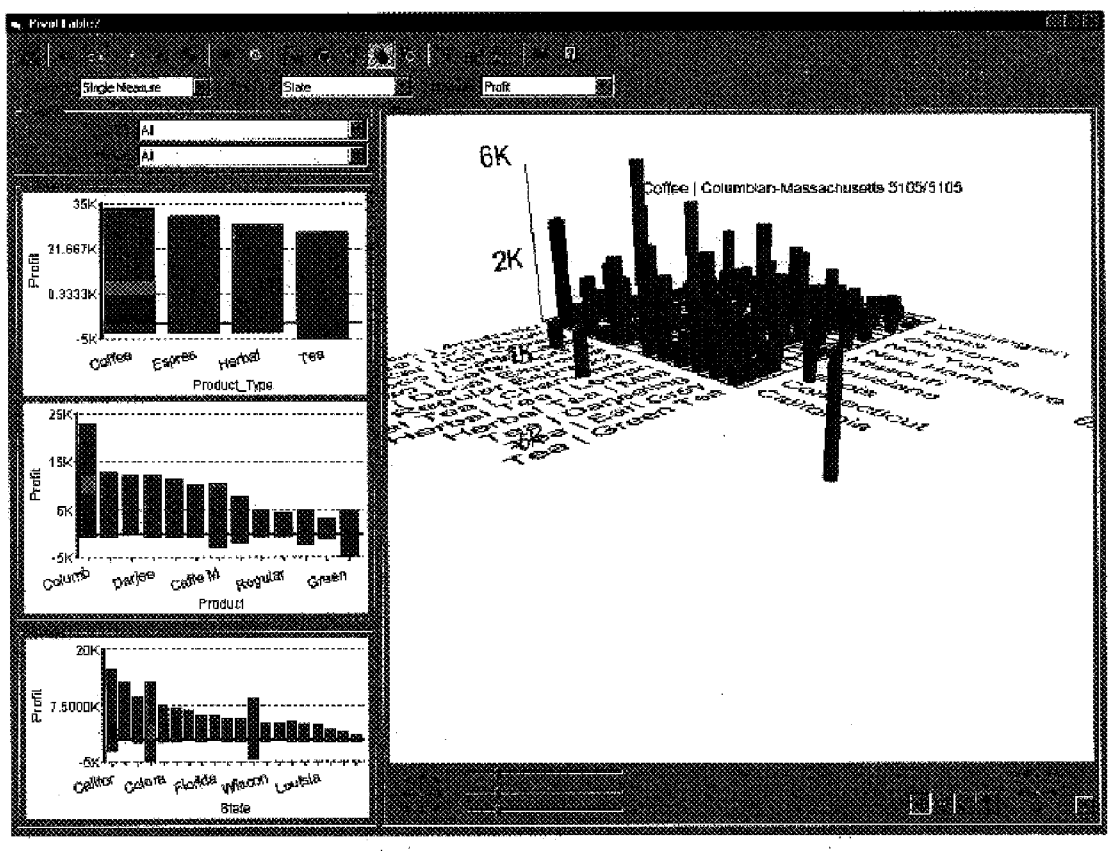

Focusing in on profitability, the exemplary embodiment of the single measure perspective shown in FIG. 9 shows profitability by product-state combination. Identifying the tallest bars by interactively touching the dimensional bar charts with the selection device shows that Colombian coffee is the most profitable product overall and California is the most profitable state. FIG. 10, which is generated by rotating the multiscape view shown in FIG. 9 for better viewing of the bars and by labeling the tallest bars, shows that the most profitable product in any one state is Colombian coffee, in Massachusetts, followed by Colombian coffee, in California.

Additionally, a user would also readily be able to notice also that one bar in FIG. 10 stands out, since it is large and points down, indicating a negative profit. Labeling this bar shows that it corresponds to Green Tea sales in Nevada. Selecting, excluding, and switching to the exemplary embodiment of the anchored measures perspective shown in FIG. 4 allows the user to quickly determine the performance of Green Tea in Nevada over the last several quarters.

It should be appreciated that the views in the various perspectives are linked by their use of a common, underlying data pool. The data in the data pool possesses properties such as color, focus and selection state. These properties manifest themselves similarly in each of the views of the various perspectives. When changes are made to one view in a particular perspective, the underlying shared data pool is modified. This modification of the underlying data pool causes all other views in that perspective, as well as the views in the other perspectives, to change accordingly.

For example, in the single measure perspective, if the user selects a single bar from a bar chart view, then the other views in the single measure perspective will change to reflect the selection state made in that bar chart view. In FIG. 9, the bar for California was selected in the "state" bar chart view. The multiscape view was updated so that only those bars associated with the state of California are selected. The other bar chart views in the single measure perspective are updated so that the portion of their bars that are associated with California are also highlighted. Similarly, if the displayed perspective was changed to the second exemplary embodiment of the multiple measures perspective shown in FIG. 4, only the data points associated with California would be displayed in the scatterplot view.

The linked views feature is important because it is the basis for visual querying. When views are linked via a common data pool, the user is free to choose the perspective and/or the view that is easiest to manipulate, using selection and excluding of data, to accomplish the desired visual query. The result of the visual query is reflected by the other views in that perspective, and in the views of the other perspectives.

Thus, by switching to the exemplary embodiment of the anchored measures perspective shown in FIG. 5, the user can determine why there are losses by looking at the relationship of five measures: profits, sales, COGS (cost of goods sold), Tot_Exp (total expenses), and Marktg (marketing). The exemplary embodiment of the anchored measures perspective shown in FIG. 5 allows the user to discern a clear and consistent pattern, that whenever profits and sales of green tea are low, the cost of goods sold, the total expenses, and the marketing costs are high. The business problem is clear. A lack of green tea sales along with high costs are causing a large loss in Nevada.

Similarly, by switching to the second exemplary embodiment of the multiple measures perspective shown in FIG. 4, the user can determine why there are losses by looking at the relationship of five measures: profits, sales, COGS (cost of goods sold), Tot_Exp (total expenses), and Marktg (marketing), taking two at a time. This is done by keeping the "profit" measure on the Y axis and cycling through the other measures on the X axis. The user is interested only in this comparison for green tea in Nevada. Accordingly, the user selects just the "green tea" and "Nevada" bars from the bar chart views, leaving the unselected points to be displayed in gray for comparison. The second exemplary embodiment of the multiple measures perspective shown in FIG. 4 also allows the user to discern a similar clear and consistent pattern, that sales are low while profit is low, and that COGS, Tot_Exp, and Marktg are high while profit is low. As in the exemplary embodiment of the anchored measures perspective shown in FIG. 5, the second exemplary embodiment of the multiple measures perspective shown in FIG. 4 allows the user to determine that whenever profits and sales of green tea are low, the cost of goods sold, the total expenses, and the marketing costs are high. Again, the business problem is clear: a lack of green tea sales along with high costs are causing a large loss in Nevada.

It should be appreciated that any combination of the various perspectives discussed above can be used in the multi-dimensional data visualization systems and methods according to this invention. Thus, in one exemplary embodiment, the multi-dimensional data visualization systems and methods according to this invention include the single measure perspective and a multiple measures perspective that includes the scatterplot view of FIG. 4. Alternatively, in another exemplary embodiment, the multi-dimensional data visualization systems and methods according to this invention include the single measure perspective, the multiple measures perspective that includes the scatterplot view of FIG. 4, and the anchored measures perspective. In a further exemplary embodiment, the multi-dimensional data visualization systems and methods according to this invention include the single measure perspective and the multiple measures perspective that includes the parabox view of FIG. 3. In yet another exemplary embodiment, the multi-dimensional data visualization systems and methods according to this invention include the single measure perspective, the multiple measures perspective that includes the parabox view of FIG. 3, and the anchored measures perspective. In still another exemplary embodiment, the multi-dimensional data visualization systems and methods according to this invention include the single measure perspective and the anchored measures perspective.

It should further be appreciated that the multi-dimensional data visualization systems and methods according to this invention can use any known or later developed single measure perspective in place of the single measure perspective shown in FIG. 2 and any of one or more known or later developed multi-measure perspectives in place of one or more of the multi-measure perspectives shown in FIGS. 3–5. Similarly, any known or later developed single measure view or multiple measure view can be incorporated into the single measure and/or the multi-measure perspectives of the multi-dimensional data visualization systems and methods according to this invention.

Various exemplary embodiments of the multi-dimensional data visualization systems and methods according to this invention integrate with Microsoft Office™ and either run as Microsoft Excel™ application enhancements or connect directly to SQL Server™7.0. Multi-dimensional data is pulled directly from the SQL Server through pivot table services. As part of the interface, the pivot table is flattened and stored internally in data tables according to the multi-dimensional data visualization systems and methods of this invention. By flattening the tables, the multi-dimensional data visualization systems and methods according to this invention enable the components to use case-based linking and focusing.

Various exemplary embodiments of the multi-dimensional data visualization systems and methods according to this invention were written in Visual Basic™6.0. However, it should be appreciated that any other known or later developed appropriate language could be used to implement the multi-dimensional data visualization systems and methods according to this invention discussed herein.

The visual components that make up the perspectives are implemented using ActiveX™ controls attached to a single data table. However, it should be appreciated that any other known or later developed set of rules that define components could be used to implement the visual components that make up the perspectives of the multi-dimensional data visualization systems and methods according to this invention discussed herein.

Various exemplary embodiments of the multi-dimensional data visualization systems and methods according to this invention can accept data from Microsoft Excel™ or directly from pivot table services. However, it should be appreciated that the multi-dimensional data visualization systems and methods according to this invention can be implemented to accept data in any other known or later developed format.

Figure 11:
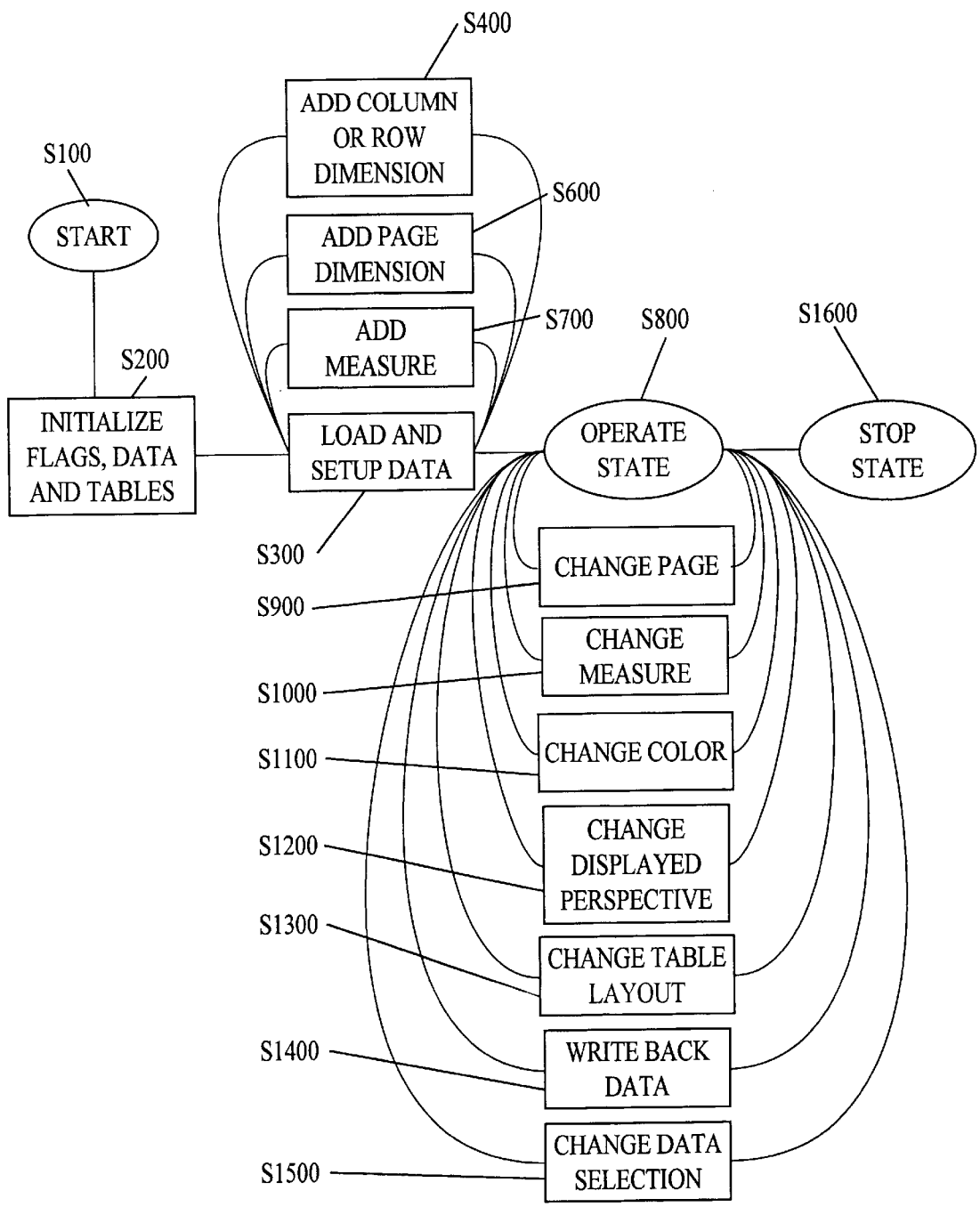
FIG. 11 is a flowchart outlining one exemplary embodiment of the data visualization methods according this invention.

FIG. 11 is a flowchart outlining one exemplary embodiment of the data visualization methods according this invention. As shown in FIG. 11, control begins in step 100 and continues to S200, where the internal states and flags are initialized. Then, in step 300, the data to be visualized is read in and the data visualization memory structures according to this invention are set up. In particular, based on the structure of the multi-dimensional data structure read in in step S300, calls are variously made to step S400 to add a column or row dimension, step S600 to add a page dimension, and step S700 to add a measure. Once the data is set up in steps S300–S700, control continues to steps S800. By performing steps S300–S700 prior to entering the operating state S800, the display is built only after all of the data has been loaded. This allows the display building process to be completed once all the data has been loaded.

In the exemplary embodiment of the data visualization methods according to this invention, once in the operating state S800, control is then based on events occurring in the user interface. These events can cause any one of steps S900–1500 to be performed. Once the user no longer wishes to continue visualizing the current multi-dimensional data structure loaded and set up in step S300, control continues to step S1600, where the control process ends.

In particular, it should be appreciated that steps S900–1500 may occur in any order based on inputs received from the user. The events and operations of steps S900–1500 may be interspersed with other events and operations that are not essential to the data visualization methods according to this invention. Thus, such other events and operations are not discussed herein.

Figure 12:
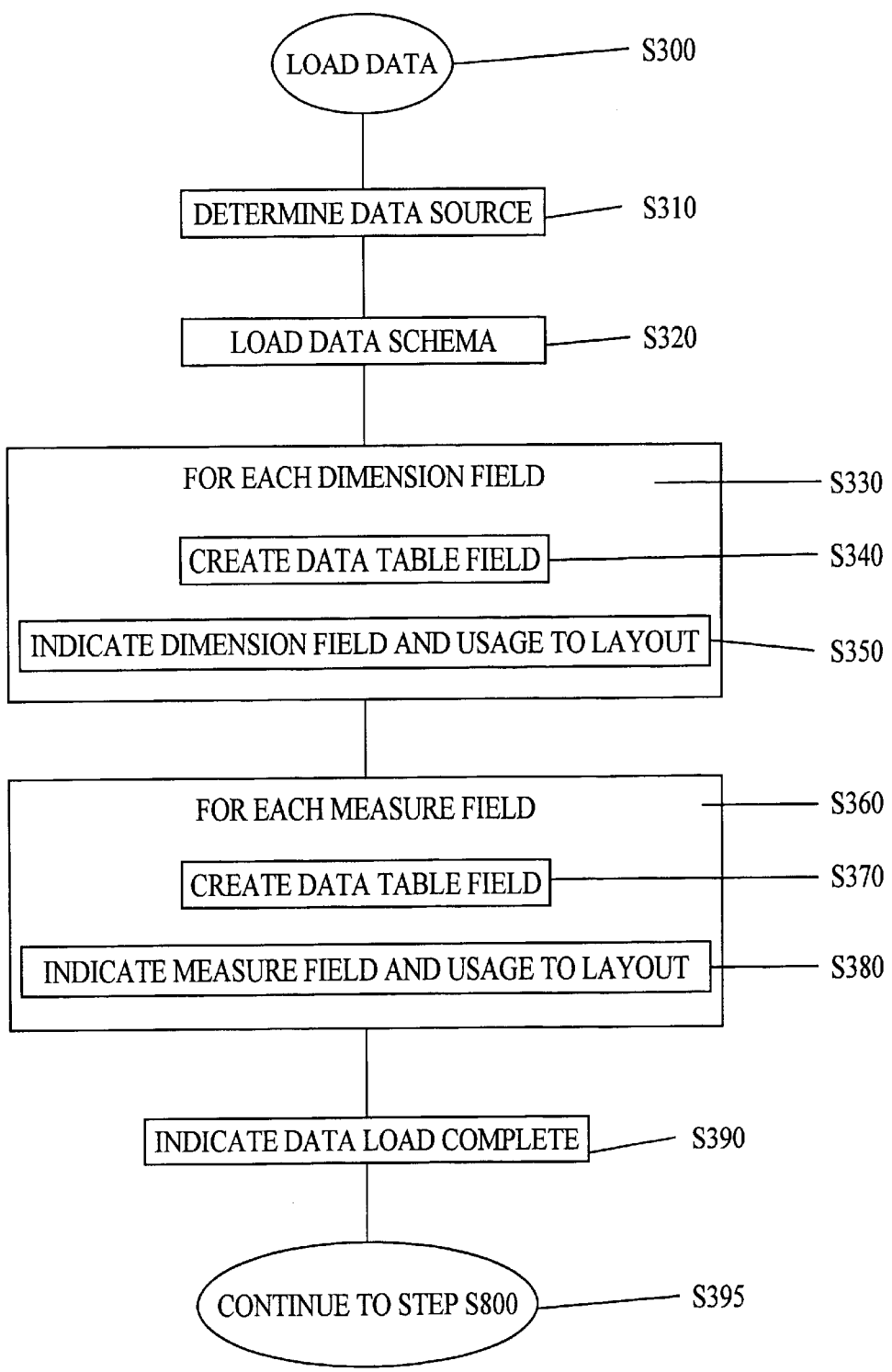
FIG. 12 is a flowchart outlining in greater detail one exemplary embodiment of a method of loading and setting up data of FIG. 11.

FIG. 12 is a flowchart outlining in greater detail one exemplary embodiment of a method of loading and setting up data of step S300. Beginning in step S300, control continues to step S310, where the source of the multi-dimensional data structure to be used is determined. For example, the data source could be determined by prompting the user to identify a multi-dimensional data structure, or by using a predetermined data source. In one exemplary embodiment, when the data visualization methods according to this invention are implemented as a plug-in to Microsoft Excel™, the data source is the current Microsoft Excel™ pivot table that is being displayed and used by the user. If no pivot table is currently being displayed or used by the user, the user will be prompted to identify a pivot table to be visualized.

Next, in step S320, the schema of the multi-dimensional data structure is determined and loaded. The schema of the multi-dimensional data structure determined in step S320 includes the names and data types of the data fields usable as dimensions and as measures, as well as the intended field layout. In general, the dimensions will be controlled by the page, row, and/or column dimensions of the multi-dimensional data structure. For example, when Microsoft Excel™ pivot tables are used, the field usage of the pivot table is used to determine the dimensions and measures. However, the layout can be arbitrarily determined or could be predetermined. Control then continues to step S330.

In step S330, a control loop is established to allow each dimension field in turn to be selected. In the control loop established in step S330, as each row, column or a page dimension is selected in step S330, control continues to step S340. In step S340, a dimension data table field is created in a central data table for the current dimension. These dimension data table fields are loaded into vectors within a table structure, with an entry provided for each available measure. This means that each intersection point of each dimension to be used is provided with a measure value field. These vectors could contain a flat representation of the data. Alternatively, these vectors could remain in a normalized state, with a simple control routine employed to determine corresponding values between all dimension fields and all measure fields.

Once the data for the current dimension is loaded into the central data table in step S340, control continues to step S350, where the presence and usage of this field is indicated by appropriately calling one of steps S400 or step S600, depending on whether the current dimension being added in the current loop of step S330 is a column dimension, a row dimension or a page dimension. After all of the dimensions have been dealt with in the loop of steps S330–S350, control continues to step S360.

In step S360, a control loop is established to allow each measure field to be added in turn to the central data table. In the control loop established in S360, as each measure field is selected in step S360, control continues to step S370. In step S370, the selected measure field is added to the central data table. Then, in step S380, as the data for that measure is loaded into the central data table, the presence and usage of that field is indicated by calling the add measures step S700. Once all of the measures have been processed in step S360–S380, control continues to step S390.

In step S390, once all of the dimensions and measure fields to be used have been added into the central data table and the corresponding data has been load into the central data table, an indication is generated that the data load is complete. Then, in step S395, control continues to the operate state S800.

Figure 13:
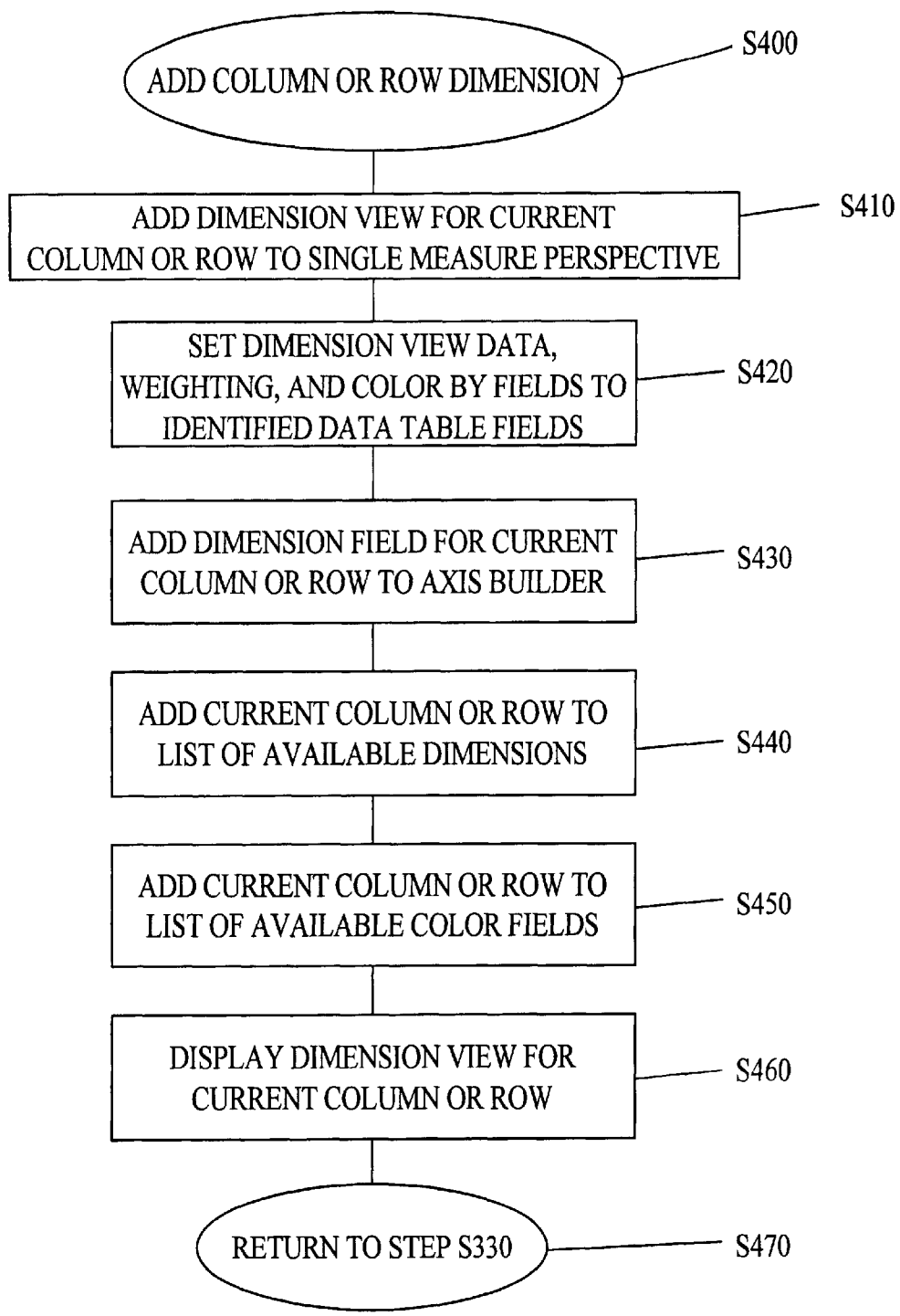
FIG. 13 is a flowchart outlining in greater detail one exemplary embodiment of the method of adding a column or row dimension to the central data table of FIG. 11.

FIG. 13 is a flowchart outlining in greater detail one exemplary embodiment of the method of adding a column or row dimension to the central data table of step S400. Beginning in step S400, control continues to step S410, where a dimensional view for the current column or row is added to the various perspectives to display the data for the current dimension. As indicated above, the dimensional view can be a bar chart view, a pie chart view or any other known or later developed view that is appropriate for displaying data of a single dimension. Control then continues to step S420.

In step S420, the dimensional view properties are set to indicate the central data table field as the data, the weighting of the data, and the color fields that are to be used when displaying the dimensional view for the current dimension. These properties are set to the appropriate field names in the central data table. Then, in step S430, the new row or column being used is indicated to an axis builder. This is done to prepare the multiscape view of the single measure perspective for display. As indicated above, the single measure perspective is a table view of a single measure field. Next, in step S440, the current row or column field is also added to the list of available dimensions. This list of available dimensions is used by the user to rearrange the displayed dimensions in the single measure perspective. Control then continues to step S450.

In step S450, the current row or column field is added to the list of available color fields. This list of available color fields is used to select the colors the displayed data may be colored by. In one exemplary embodiment, the list of available colors is implemented as a list menu control of a combo box of fields. Next, in step S460, the dimensional view for a column or row is placed and displayed in various perspectives. Then, in step S470, control returns to step S330.

Figure 14:
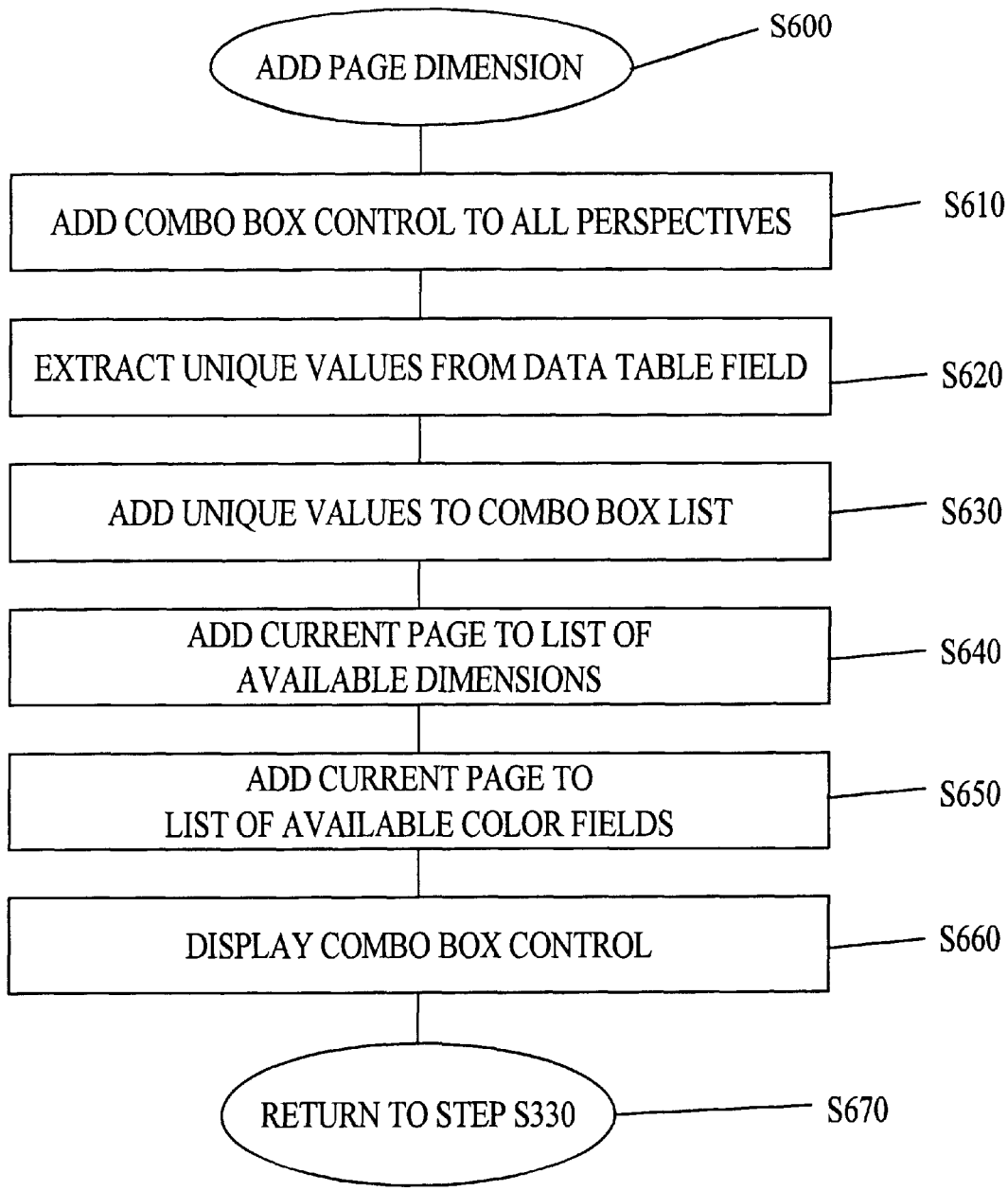
FIG. 14 is a flowchart outlining in greater detail one exemplary embodiment of a method of adding a page dimension of FIG. 11.

FIG. 14 is a flowchart outlining in greater detail one exemplary embodiment of a method of adding a page dimension of step S600. Beginning in step S600, control continues to step S610, where a combo box control widget is added to various perspectives of this invention. Next, in step S620, a list of the unique values within the field data for the current page is extracted. Then, in step S630, these unique extracted values are added to the list menu control of the combo box. It should be appreciated that an additional "all" value is also added to the list menu control to allow all the values contained in the list to be selected. Control then continues to step S640.

In step S640, the current page field is added to a list of available page dimension fields to allow the user to select different pages of the multi-dimensional data structure to be displayed in a current of one of the single measure perspective, the multiple measures perspective or the anchored measures perspective. Then, in step S650, the current page field is also added to the list menu control of the combo box of fields. As indicated above in step S450 of FIG. 13, this combo box of field is used to allow the user to select the colors that the displayed data may be colored by. Next, in step S660, the combo box control for the current page dimension is placed and display in the various perspectives. Control then continues to step S670, where control returns to step S330.

Figure 15:
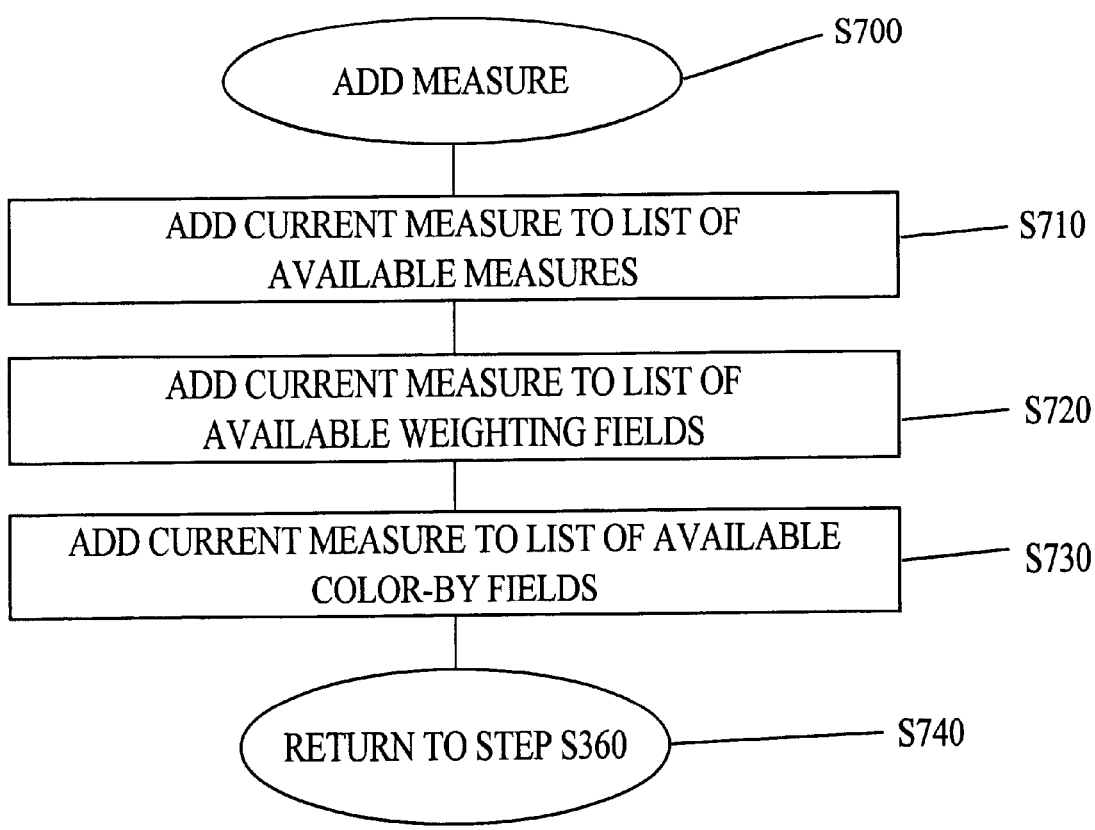
FIG. 15 is a flowchart outlining in greater detail one exemplary embodiment of a method of adding a measure of FIG. 11.

FIG. 15 is a flowchart outlining in greater detail one exemplary embodiment of a method of adding a measure of step S700. Beginning in step S700, control continues to step S710, where a field for the current measure is added to a list of available measures. Next, in step S720, a field for the current measure is also added to the list of fields available to weight the currently displayed perspective. In particular, the field for the current measure is added to a combo box list of the single measure perspective to allow the user to select the particular measure that is used to weight all row and column dimensions in the dimensional views and as the single measure field to be displayed in the multiscape view of the single measure perspective. Next, in step S730, the field for the current measure is also added to the list menu control of the combo box of fields that is used to select the colors that the displayed data may be colored by. Control then continues to step S740, where control returns to step S360.

As shown in FIG. 11, when control is in the operate state S800, based on user input, control can jump to anyone of step S900, where the displayed page can be changed, step S1000, where the displayed measure can be changed, step S1100, where the displayed color mapping is changed, step S1200, where the displayed perspective can be changed, step S1300, where the table layout can be changed, step S1400, where a result set based on the currently selected data can be written back into a new multi-dimensional structure, or step S1500, where the selected data can be changed.

Figure 16:
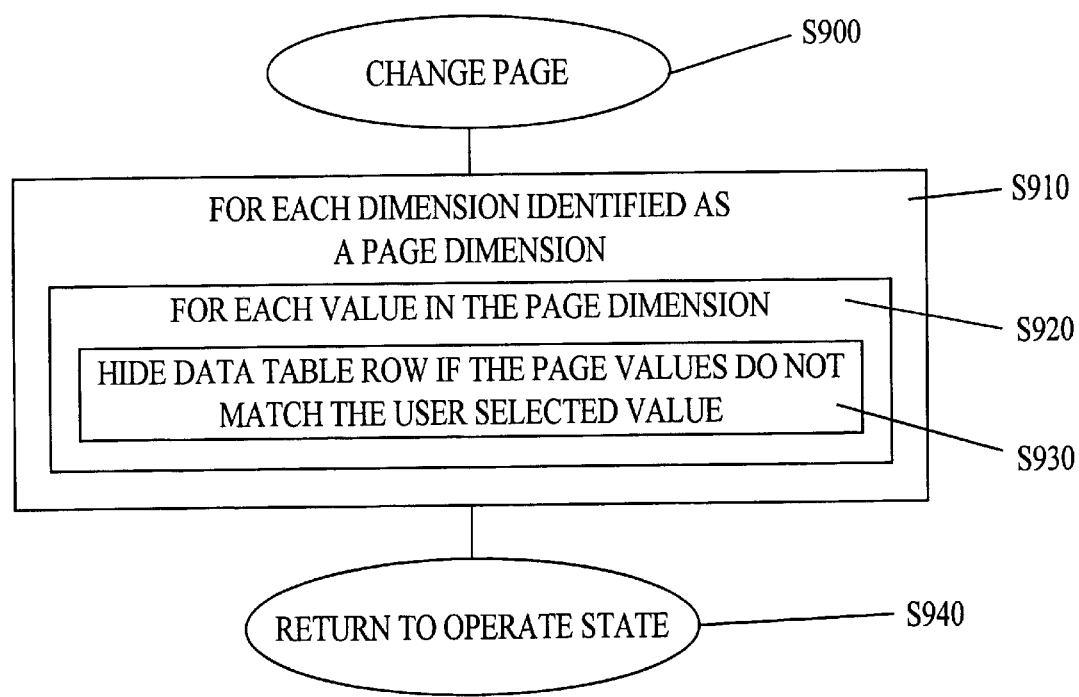
FIG. 16 is a flowchart outlining in greater detail one exemplary embodiment of a method of changing the selected page for display of FIG. 11.

FIG. 16 is a flowchart outlining in greater detail one exemplary embodiment of a method of changing the selected page for display of step S900. As indicated above, control continues from step S800 to step S900 when the user generates an input to change the page of data being displayed in the currently displayed perspective. For example, a user may selected a page dimension for display using a page dimension list of a page dimension combo box. Upon selecting a new page for display, control continues from step S900 to step S910.

In step S910, a first control loop is established to allow each dimension in turn to be checked, and only those dimensions that are identified as page dimensions to be selected. When a page dimension is selected, control continues to step S920.

In step S920, a second control loop is established to allow in turn each value in the current page dimension to be selected. Next, in step S930, if the page value of the current value selected in step S920 does not match the user selected value, the data table row for that value is hidden. Once all of the values of the current page dimension are selected, control returns to step S910. Thus, as a result, only those rows that have a matching field in their corresponding combo box list control will be displayed. Once all of the dimensions are checked in step S910, control continues to step S940. In step S940, control returns to the operate state S800.

Figure 17:
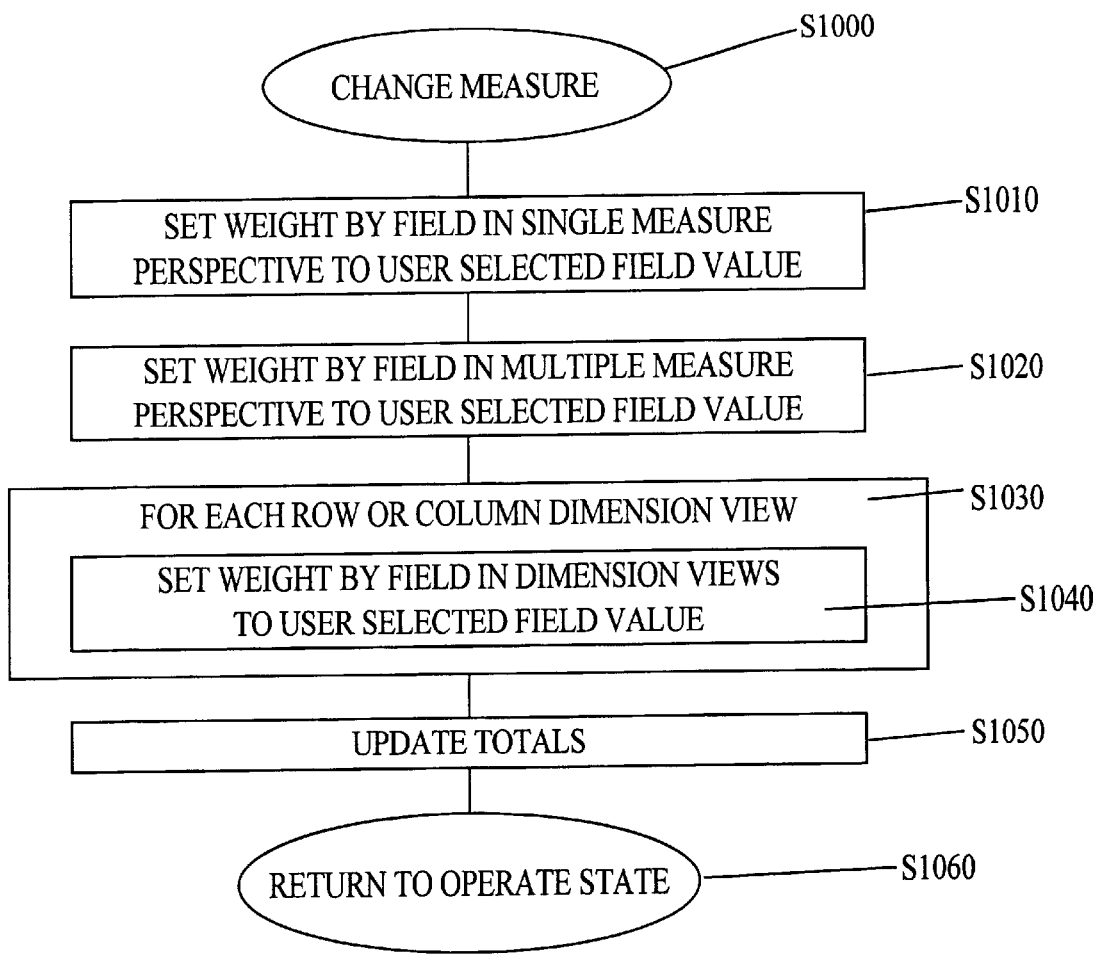
FIG. 17 is a flowchart outlining in greater detail one exemplary embodiment of a method of changing the displayed measure of FIG. 11.

FIG. 17 is a flowchart outlining in greater detail one exemplary embodiment of a method of changing the displayed measure of step S1000. In particular, control continues from the operate state S800 to the change measure step S1000 when the user generates an input to change or select a particular measure field to be used to weight the display of the dimensional views of the dimensional view portion of the single measure or multiple measures perspectives, and used to weight the multiscape view of the single measure perspective.

Accordingly, beginning in step S1000, control continues to step S1010, where the field used to weight the single measure perspective is set to the user selected field value. Next, in step S1020, the field used to weight the various views in the multiple measures perspective is set to the user selected field value. Control then continues to step S1030.

In step S1030, a control loop is established to select in turn each row and column dimensional view. Then, in step S1040, for the current row or column dimensional view, the field used to weight that dimensional view is set to the user selected field value. Once all of the row and column dimensional view have been selected, control continues to step S1050.

In step S1050, the totals are updated to reflect the new measure and to display the information. Next, in step S1060, control returns to the operate state.

Figure 18:
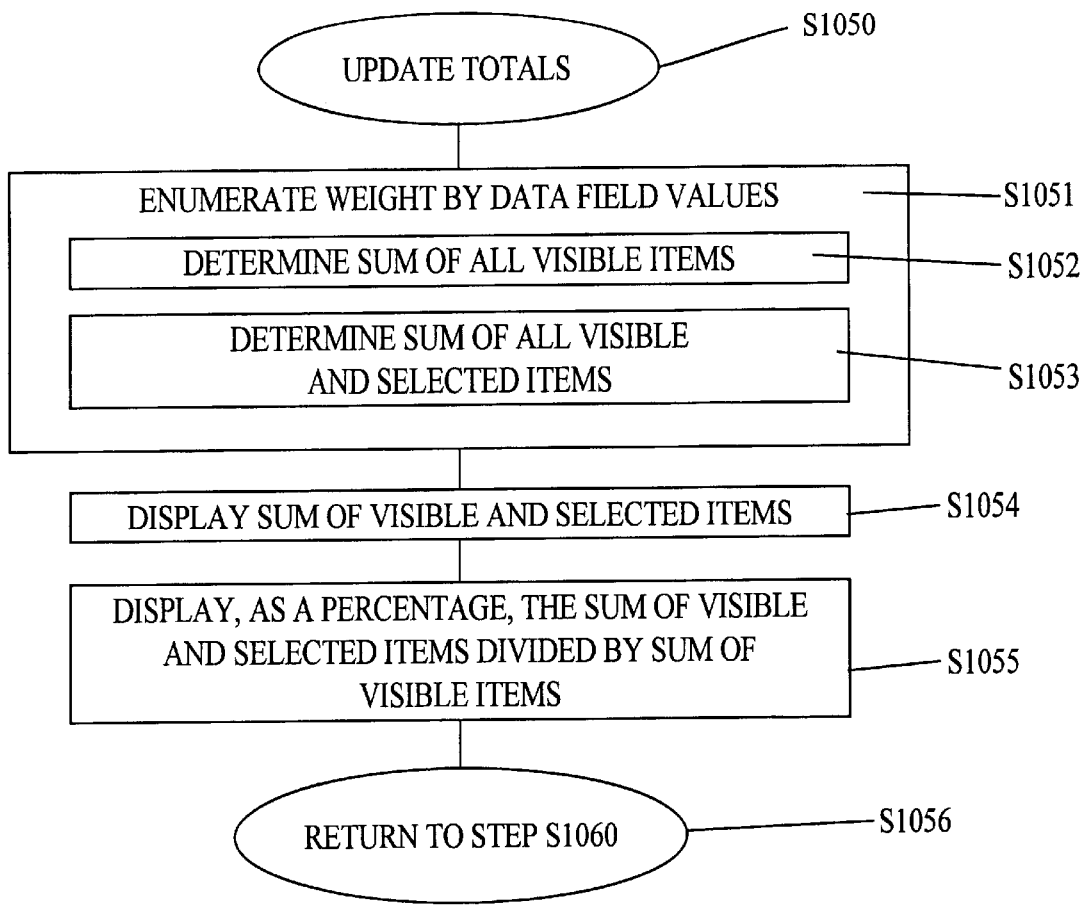
FIG. 18 is a flowchart outlining in greater detail one exemplary embodiment of a method of updating the totals of FIG. 17.

FIG. 18 is a flowchart outlining in greater detail one exemplary embodiment of a method of updating the totals of step S1050. Beginning in step S1050, control continues to step S1051, where a control loop is established to select in turn each data field. Then, in step S1052, the sum of all visible items is determined. Next, in step S1053, the sum of all visible and selected items is determined. Once both of these sums are determined for each data field, control continues to step S1054.

In step S1054, the sums of the visible and selected items is displayed for each displayed dimension. Next, in step S1055, the percentage of the visible and selected items of the sum of the visible items is displayed for each displayed dimension. Then, in step S1056, control returns to step S1060.

Figure 19:
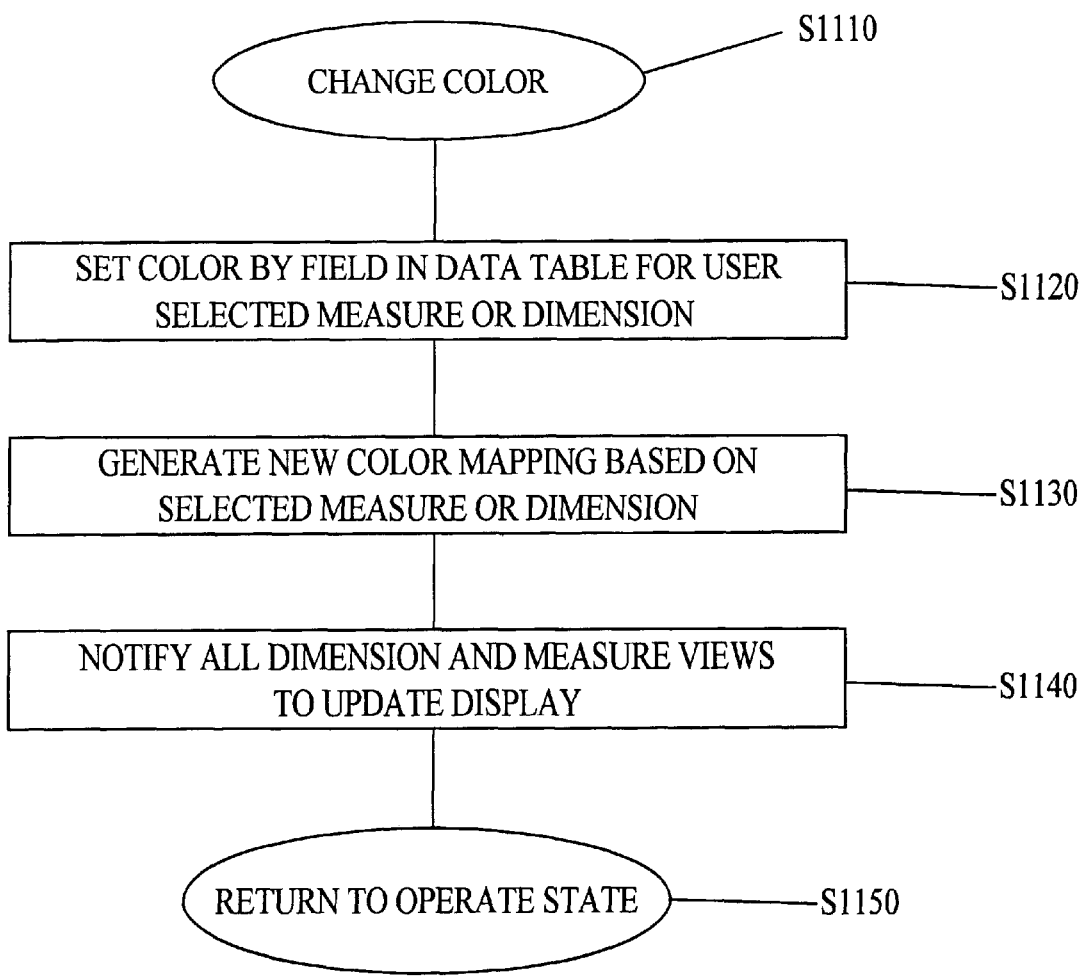
FIG. 19 is a flowchart outlining in greater detail one exemplary embodiment of a method of changing the color mapping used to color a particular dimension or measure of FIG. 11.

FIG. 19 is a flowchart outlining in greater detail one exemplary embodiment of a method of changing the color mapping used to color a particular dimension or measure of step S1100. When in the operate state S800, the user may generate an input to change the color mapping used to color a particular dimension or measure within the various views of the various perspectives, by associating a range of color values to the range of data values for the selected dimension or field. In response, control continues to step S1100.

Beginning in step S1100, control continues to step S1110, where the "color-by" field in the central data table for the user selected dimension or measure is set. Then, in step S1120, a new color mapping is generated between the data values for the user-selected dimension or measure set in step S1110 and a predetermined color range. Next, in step S1130, all dimension and measure views in all of the various perspectives are updated based on this new color mapping. Then, control continues to step S1140, where control returns to the operate state S800.

Figure 20:
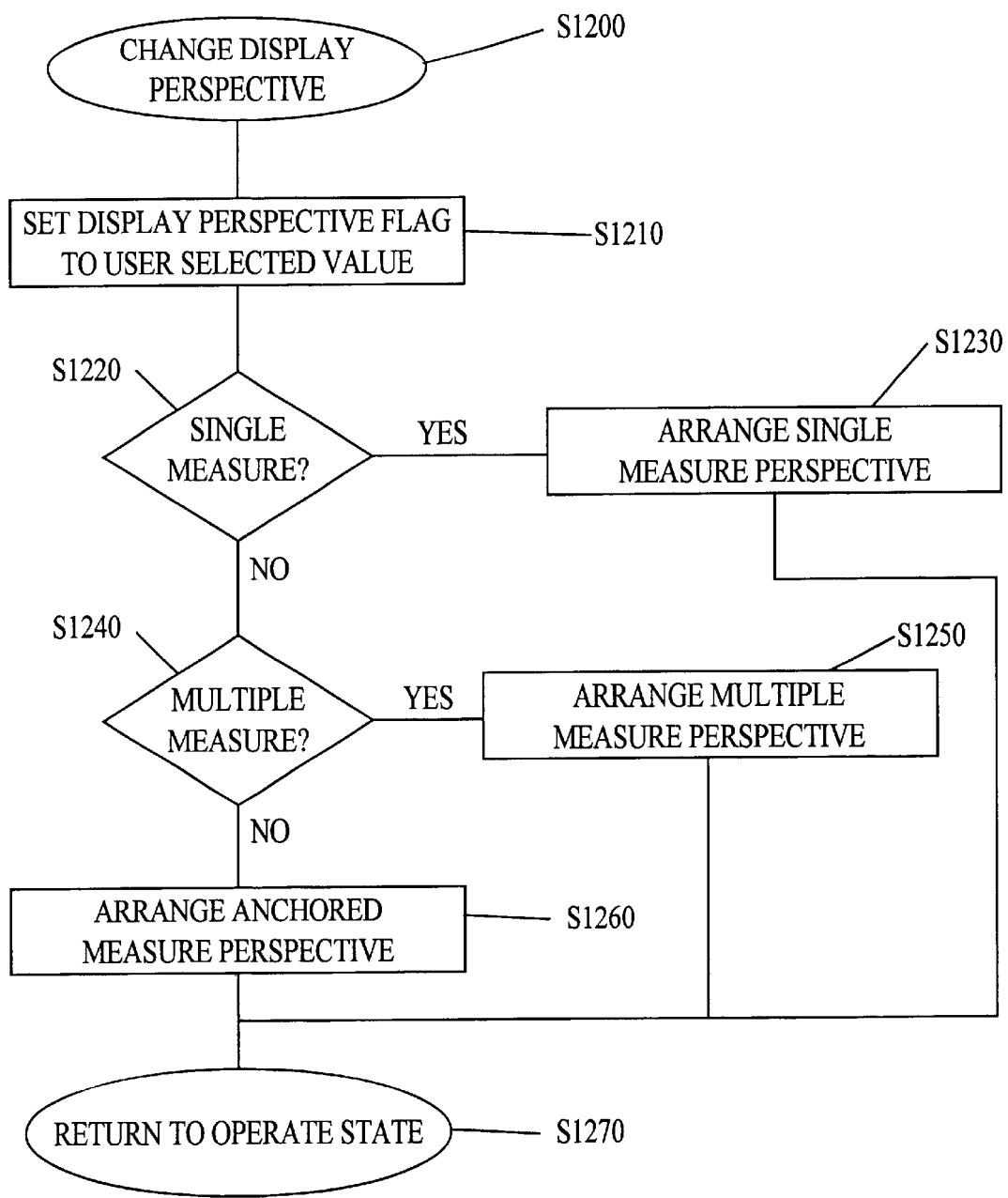
FIG. 20 is a flowchart outlining in greater detail one exemplary embodiment of a method of changing the displayed perspective of FIG. 11.

FIG. 20 is a flowchart outlining in greater detail one exemplary embodiment of a method of changing the displayed perspective of step S1200. In step S800, the user may generate an input to change the perspective being displayed. In response, control continues to step S1200.

Beginning at step S1200, control continues to step S1210, where a display perspective flag is set to the user-selected perspective. Then, in step S1220, a determination is made if the displayed perspective flag is set to the single measure perspective. If so, control continues to step S1230. Otherwise, control jumps to step S1240. In step S1230, the single measure perspective is arranged and displayed. Control then jumps to step S1270.

In contrast, in step S1240, the display perspective flag is checked to determine if the multiple measure perspective is selected. If so, control continues to step S1250. Otherwise, control jumps to step S1260. In step S1250, the multiple measure perspective is arranged and displayed. Control then again jumps to step S1270. In step S1260, the anchored measures perspective is arranged and displayed. Control continues to step S1270, where control returns to the operate state.

It should be appreciated that, if fewer perspectives are implemented in any particular implementation of the systems and methods of this inventions, one or more of steps S1240–S1270 may be omitted and/or revised to reflect the particular perspectives that are implemented. Similarly, if different ones of the various perspectives are implemented, one or more of steps S1240–S1270 may be revised to reflect the particular perspectives that are implemented. Finally, if additional perspectives are implemented in any particular implementation of the systems and methods of this inventions, additional steps corresponding to one or more of steps S1240–S1270 may be added to reflect the particular perspectives that are implemented.

Figure 21:
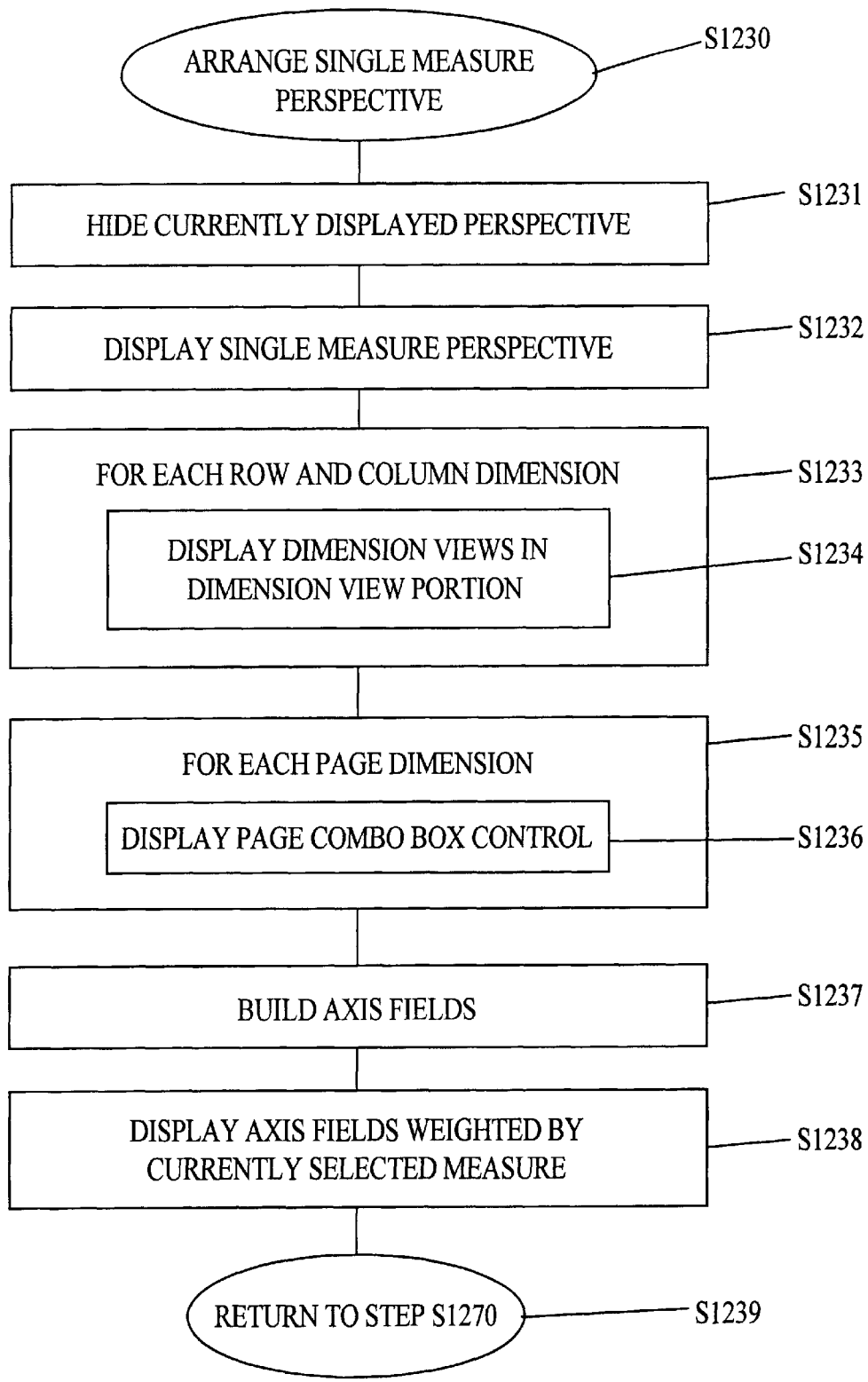
FIG. 21 is a flowchart outlining in greater detail one exemplary embodiment of a method of arranging and display the single measure perspective of FIG. 20.

FIG. 21 is a flowchart outlining in greater detail one exemplary embodiment of a method of arranging and display the single measure perspective of step S1230. Beginning is step S1230, control continues to step S1231, where the currently displayed perspective is hidden from display. Then, in step S1232, the single measure perspective is displayed. Control then continues to step S1233.

In step S1233, a control loop is established that selects in turn each row and column dimension. In step S1234, for the currently selected row or column dimension, a dimensional view is displayed in the dimensional view portion of the single measure perspective. Once all of the row and column dimensions have been selected, control continues to step S1235.

In step S1235, a control routine is established that selects each page dimension in turn. Then, in step S1236, a page combo box control widget for the current page dimension is displayed in the single measure perspective to allow the selected page that is displayed in the single measure view to be changed. Control then continues to step S1237. In step S1237, the axis fields are built. Next, in step S1238, the resulting axis fields are used to build the multiscape view of the single measure perspective and the currently selected measure field is used to weight the displayed multiscape view. Next, in step S1239, control returns to step S1270.

Figure 22:
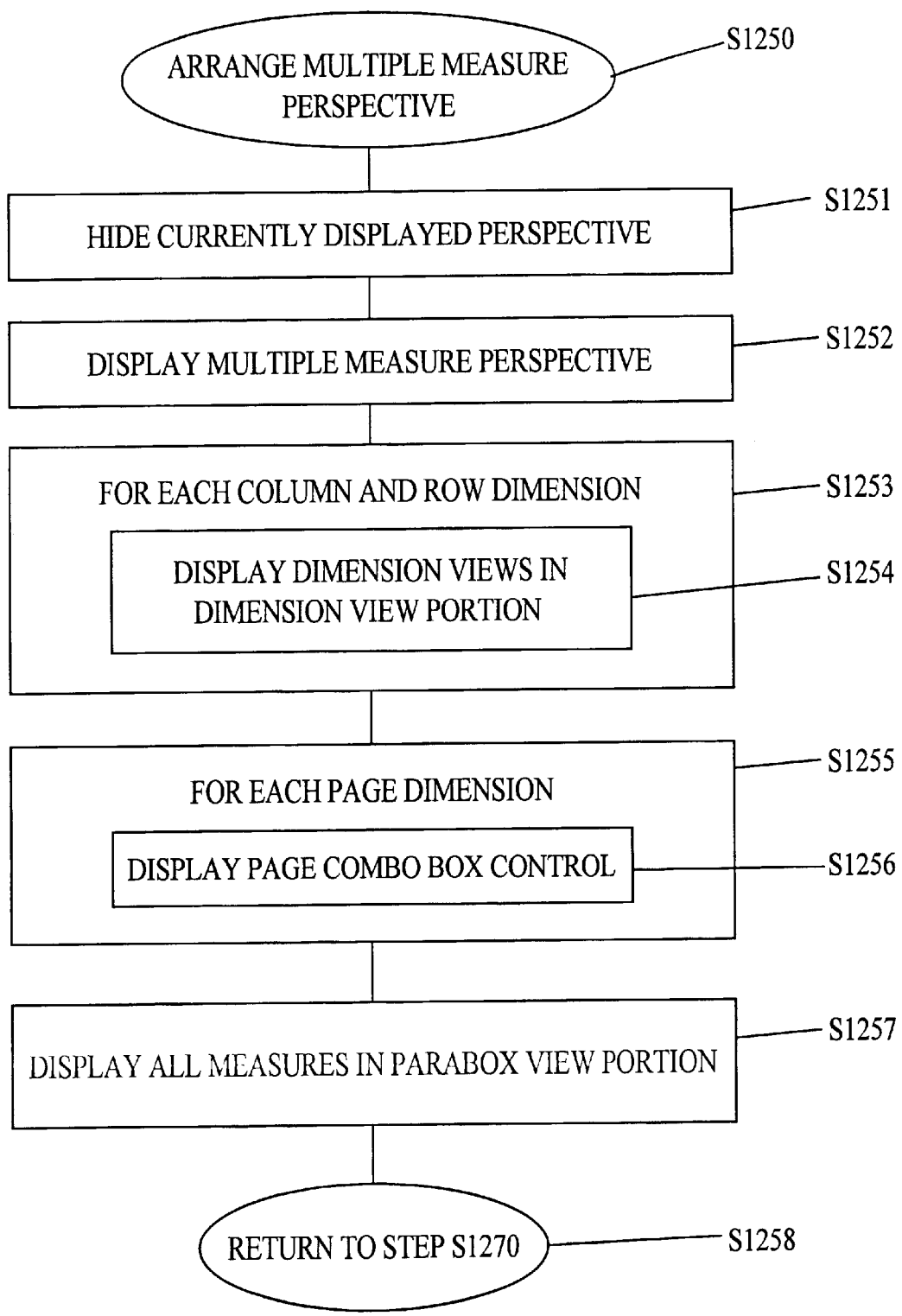
FIG. 22 is a flowchart outlining in greater detail one exemplary embodiment of a method of arranging and displaying the multiple measures perspective of FIG. 20.

FIG. 22 is a flowchart outlining in greater detail one exemplary embodiment of a method of arranging and displaying the multiple measures perspective of step S1250. Beginning in step S1250, control continues to step S1251, where the currently displayed perspective is hidden. Next, in step S1252, the multiple measures perspective is displayed. Control then continues to step S1253.

In step S1253, a control loop is established that selects in turn each column and row dimension. Then, in step S1254, a dimensional view is displayed for the selected column or row dimension in the dimensional view portion of the multiple measures perspective. Once all of the column and row dimensions have been selected, control continues to step S1255.

In step S1255, a control loop is established that selects in turn each page dimension. Then, in step S1256, a page combo box control widget for the current page dimension is displayed in the multiple measures perspective for each page dimension. Once all the page dimensions have been selected, control continues to step S1257.

In step S1257, the data property for the multiple measure perspective is set to display all available measure fields stored in the central data table. Thus, all measures are displayed in the measures view portion of the multiple measures perspective. Control then continues to step S1258, which returns control to step S1270.

Figure 23:
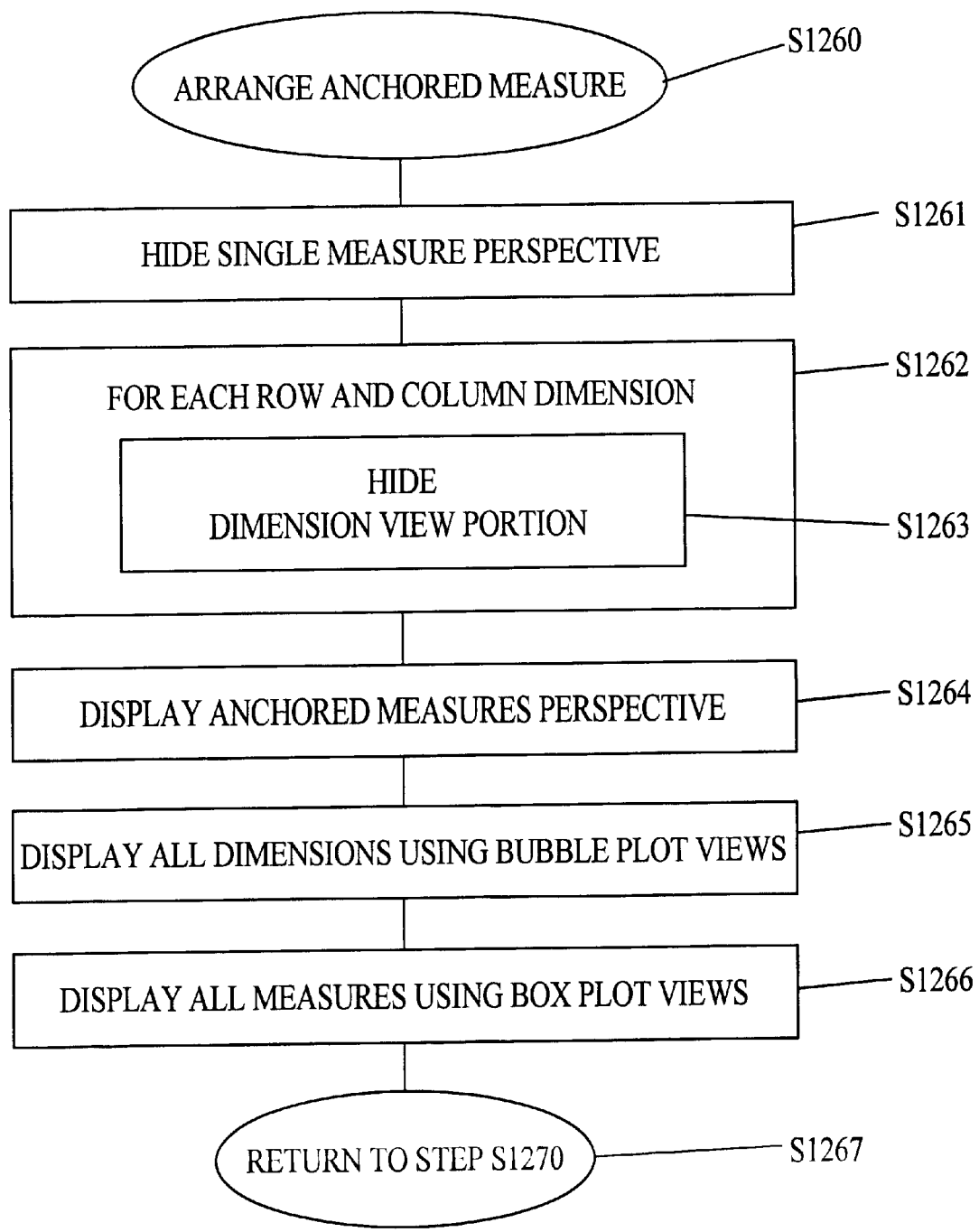
FIG. 23 is a flowchart outlining in greater detail one exemplary embodiment of a method of arranging and displaying the anchored measured perspective of FIG. 20.

FIG. 23 is a flowchart outlining in greater detail one exemplary embodiment of a method of arranging and displaying the anchored measured perspective of step S1260. Beginning in step S1260, control continues to step S1261, where the currently displayed perspective is hidden. Then, in step S1262, a control loop is established to select in turn each row and column dimension. Next, in step S1263, the dimensional view is hidden for each selected row or column dimension. Once all the row and column dimension have been selected in step S1262, control continues to step S1264.

In step S1264, the anchored measured perspective is displayed. Then, in step S1265, the data property for the anchored measured perspective is set to display all available dimensions. Accordingly, all dimensions are displayed in a bubble plot view portion of the anchored measured perspective. Next, in step S1266, the data property of the anchored measures perspective is set to display all available measures. Thus, all measures are displayed in the bar plot view portion of the anchored measures perspective. Control then continues to step S1267, which returns control to step S1270.

Figure 24:
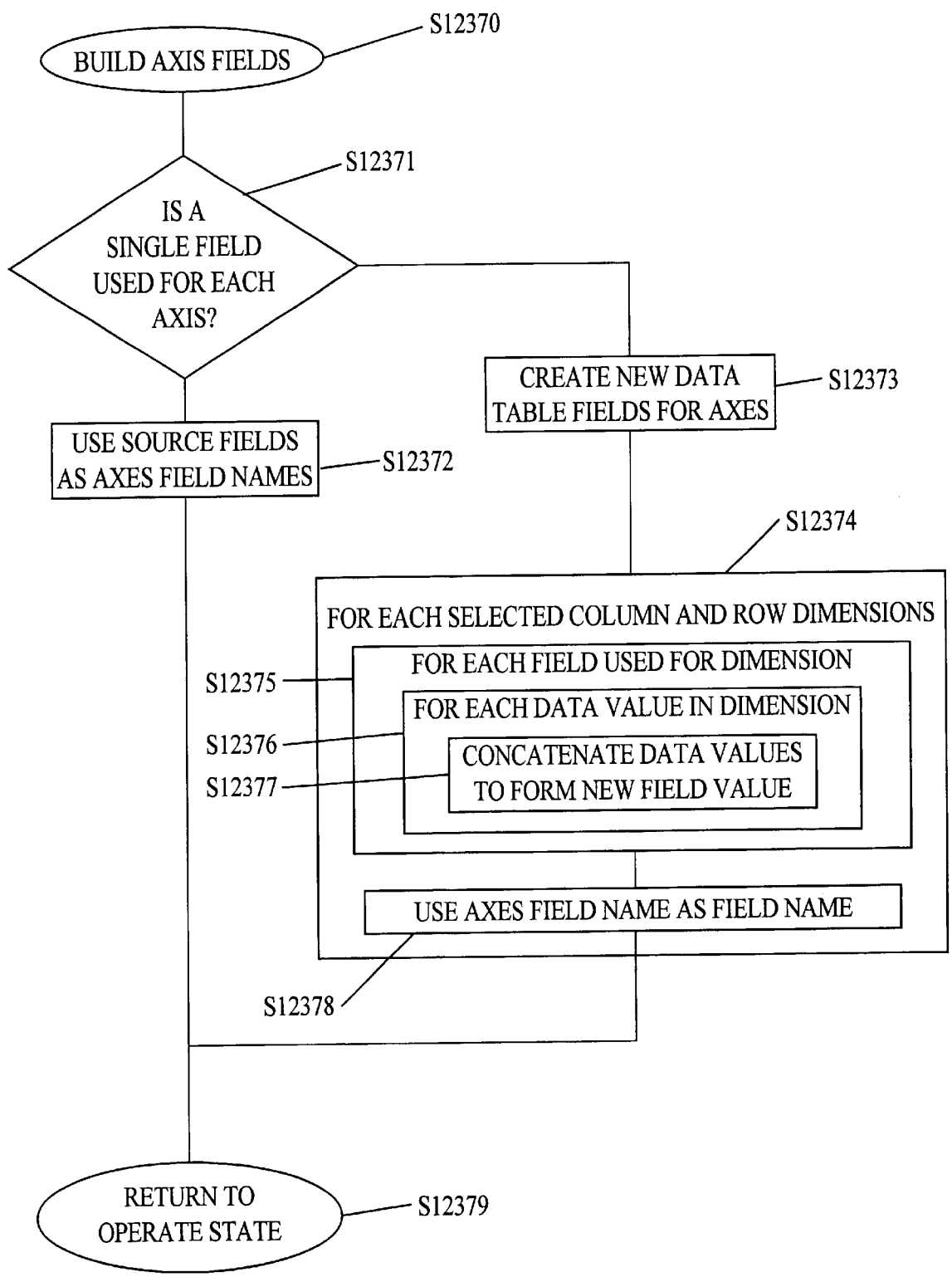
FIG. 24 is a flowchart outlining in greater detail one exemplary embodiment of a method of building axis fields of FIG. 21.

FIG. 24 is a flowchart outlining in greater detail one exemplary embodiment of a method of building axis fields of step S1237. As set forth above, the data being displayed according to the data visualization methods of this invention is multi-dimensional. However, the multiscape view of the single measures respective is inherently two-dimensional. Thus, if more than two dimensions are selected for display, it becomes necessary to combine multiple dimensions to create a row or column axis. Accordingly, in this exemplary embodiment of the build axis fields method of step S1237, control continues from step S1237 to step S12371, where a determination is made whether a single dimension is used for each horizontal axis of the three-dimensional multiscape view. If so, control continues to step S12372. Otherwise, control jumps to step S12373.

In step S12372, the two source dimensions are used as the axis fields for the two horizontal dimensions of the three-dimensional multiscape view. Control then jumps to step S12379.

In contrast, if more than a single dimension is used for at least one of the horizontal dimensions of the three-dimensional multiscape view, control jumps to step S12373. In step S12373, a new data table field is created for each of the two horizontal axes. Control then continues to the control loop beginning in step S12374.

In step S12374, for each selected column and row dimension, a current dimension is selected and control continues to step S12375. In step S12375, for each field of the current dimension, a current field is selected and control continues to step S12376. In step S12376, for each data value in the current filed, control continues to step S12377. In step S12377, the data values for the current field are concatenated to form a new field value for the new data table field corresponding to the current dimension.

Once the control loop of steps S12374–S12377 has generated the new field values for the new data table fields base on each field of each dimension to be displayed along the horizontal axes in the three-dimensional multiscape, control continues to step S12378. In step S12378, control returns to step S1238, where the new data table fields are used as the dimensions for the horizontal axes of the three-dimensional multiscape.

Figure 25:
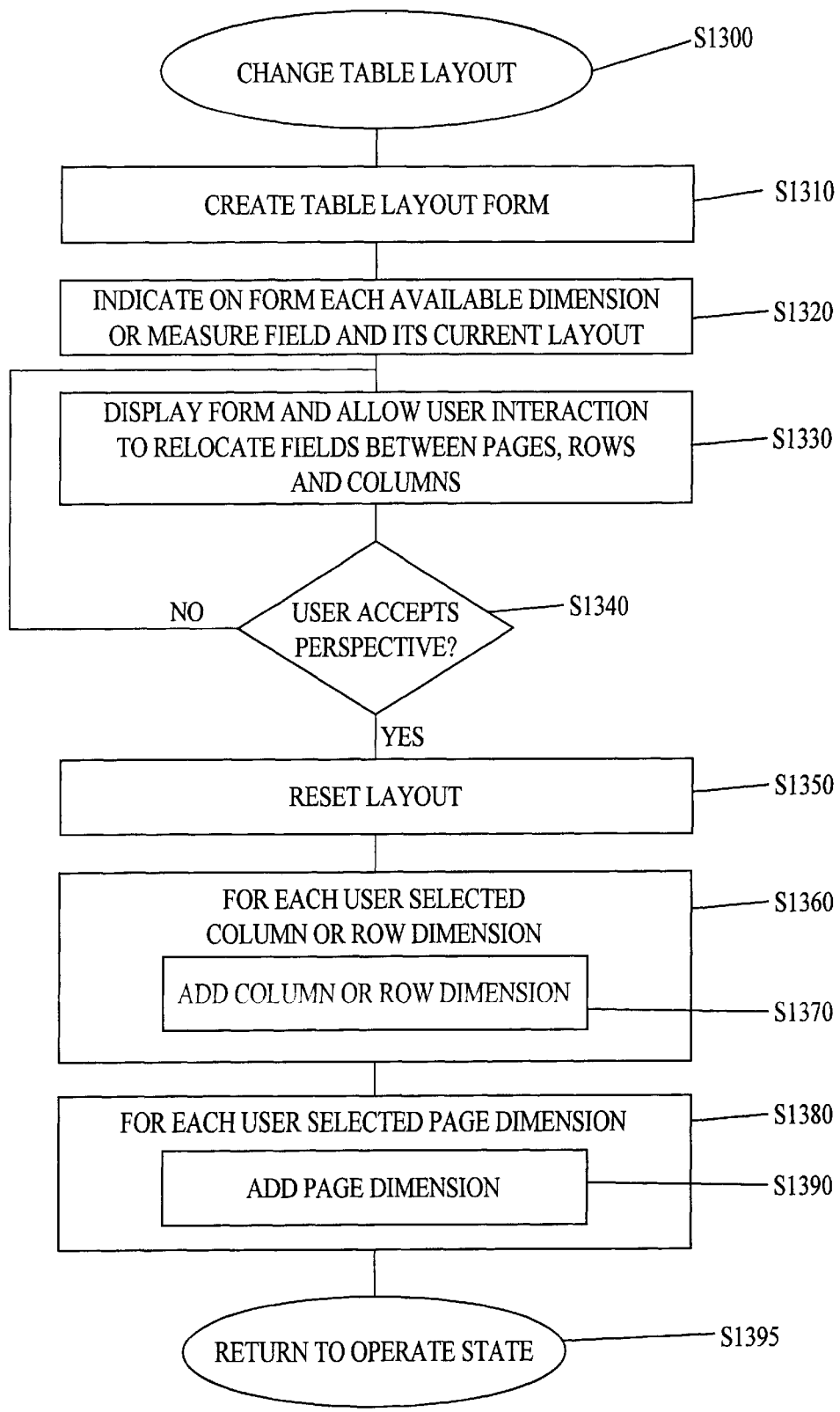
FIG. 25 is a flowchart outlining in greater detail one exemplary embodiment of a method of changing the table layout of FIG. 11.

FIG. 25 is a flowchart outlining in greater detail one exemplary embodiment of a method of changing the table layout of step S1300. A user may generate an input indicating the table layout is to be changed. The table layout determines which dimension fields represent which columns, rows and pages and in what order the dimension fields are displayed. This layout ultimately controls the arrangement of the dimensional views and the dimensional view portion of the single measure perspective. In particular, rearranging the rows and columns makes it easier for the user to find significant patterns or relationships within the data of the measure currently displayed in the single measure perspective.

Accordingly, beginning in step S1300, control continues to step S1310, where a table layout form for the single measure perspective is created. Next, in step S1320, each available dimension or measure field is indicated on the created table layout form at its current layout position. Next, in step S1330, the form is displayed in an interactive manner to allow the user to relocate the displayed fields between the page, row and column dimensions of the multi-dimensional data structure being displayed. In particular, the user may drag each of the icons representing the available dimensions or measure fields from its current layout position to the new desired layout position. Control then continues to step S1340.

In step S1340, a determination is made whether the user has input an indication that the altered form is acceptable. If no such indication has been received from the user, control jumps back to step S1330 to allow the user to further alter the created table layout form. Otherwise, once the user indicates the form has reached an acceptable arrangement, control continues from step S1340 to step S1350.

In step S1350, the currently displayed layout is reset to remove all current page, column and row dimensional views from the single measures perspective. Next, in step S1360, each selected column or row dimension selected by the user in step S1330 is selected in turn. Then, in step S1370, the selected column or row dimension is added to the single measures view as outlined in FIG. 13. Once all of the user selected column or row dimensions have been selected in turn, control continues to step S1380.

In step S1380, each selected page dimension selected by the user in step S1330 is selected in turn. Then, in step S1390, each selected page dimension is added to the single measures perspective as outline with respect to FIG. 14. Once all of the page dimensions have been selected in turn, control continues to step S1395, where control returns to the operating state.

It should be appreciated that the above outlined method of changing the table layout outlined in FIG. 25 is merely one possible method of rearranging the displayed dimensions. Thus, it should be appreciated that the same result can be obtained by any number of other equivalent methods, such as directly dragging the dimensional views of the single measures perspective directly to the desired locations or by dragging the edges of the table within the single measures perspective.

Figure 26:
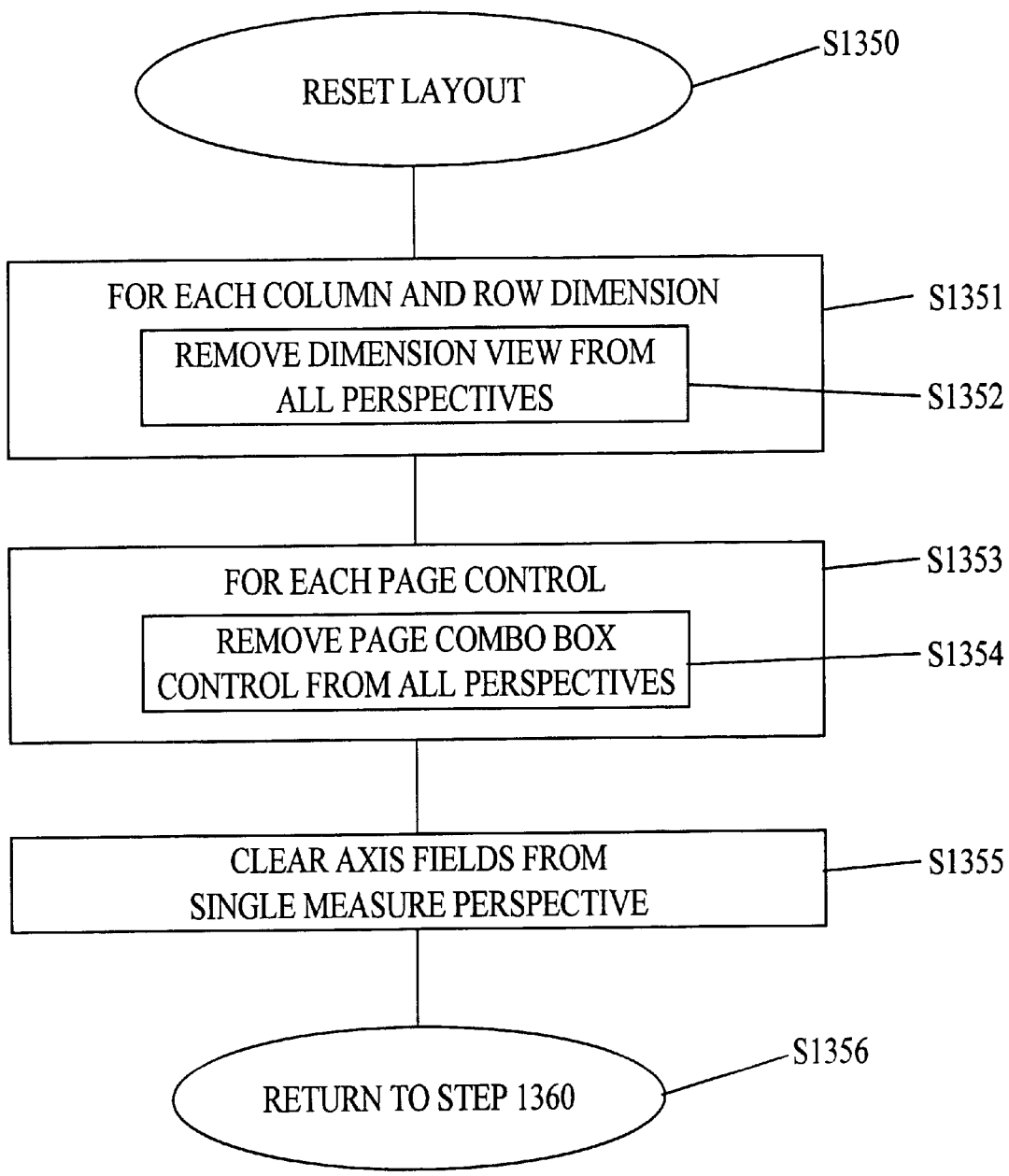
FIG. 26 is a flowchart outlining one exemplary embodiment of a method of resetting the layout of FIG. 25.

FIG. 26 is a flowchart outlining one exemplary embodiment of a method of resetting the layout of step S1350. Beginning in step S1350, control continues to step S1351, where a control loop is established to allow in turn each column or row dimension displayed in the current layout of the single measure perspective to be selected. Then, in step S1352, the current dimensional view is removed from the dimensional view portion of the single measures perspective. Control then continues to step S1353.

In step S1353, a control loop is established to allow in turn each page combo box control widget displayed in the current layout of the single measure perspective to be selected. Next, in step S1354, the current page combo box control widget is removed from the current layout of the single measure perspective. Control then continue to step S1355.

In step S1355, the currently established axis fields built in step S1237 are cleared from the current layout of the single measures perspective. Next, in step S1356, control continues to step S1360.

Figure 27:
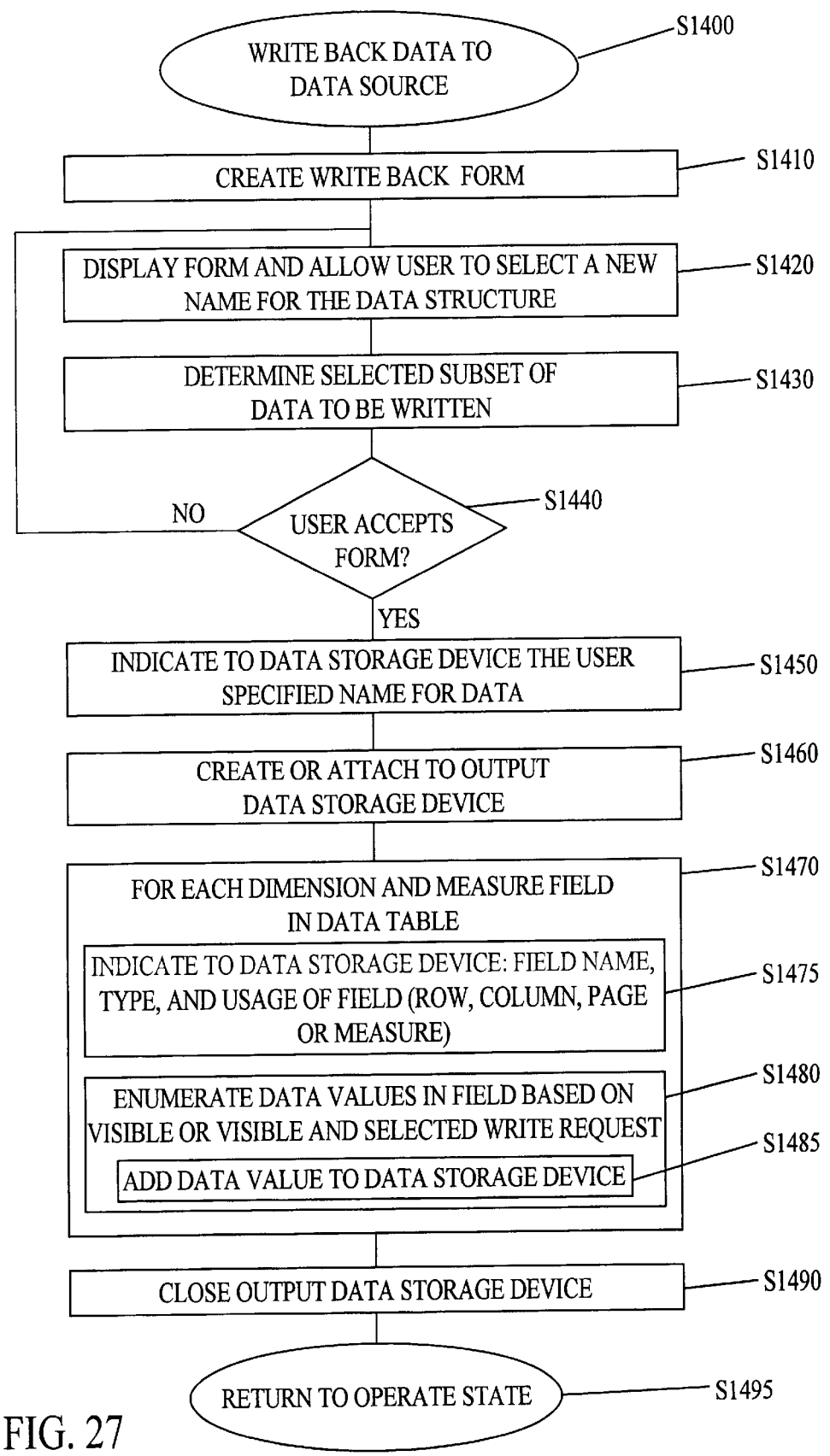
FIG. 27 is a flowchart outlining in greater detail one exemplary embodiment of a method of writing back data to the data source of FIG. 11.

FIG. 27 is a flowchart outlining in greater detail one exemplary embodiment of a method of writing back data to the data source of step S1400. In the operate step S800, the user may generate an input indicating that a write-back operation is to be performed to write the currently displayed subset of the data back into a new multi-dimensional data structure or the like. This currently displayed subset includes either all visible items, or only that portion of the visible items that is currently selected. While the data is generally written back as a new multi-dimensional data structure, the data could be written in any known or later developed format, such as a disk file, a database table, or to a report generator.

Accordingly, beginning in step S1400, control continues to step S1410, where a writeback form is created. Then, in step S1420, the created writeback form is displayed to the user to allow the user to select a name for the data to be written back. Then, in step S1430, the displayed form is used to determine the subset of the data to be written back. Control then continues to step S1440.

In step S1440, a determination is made whether the user has indicated that the current state of the writeback form is acceptable. If not, control jumps back to step S1420 to allow the user to change the name of the data and the subset of the data to be written back. Otherwise, once the user indicates acceptance, control continues to step S1450.

In step S1450, the name specified by the user for the data to be written back is output to the device to which the written-back data will be output. Then, in step S1460, if necessary, a reference to the named data storage area will be retrieved to facilitate the transfer of data to that named data storage area. Next, in step S1470, a control loop is established to select in turn each dimension and measure field selected in the writeback form by the user. Next, in step S1475, for the current dimension or measure field, the field name, type and usage of the field is output to the data storage device. It should be appreciated that, if appropriate, the layout information can also be transferred, such that the receiving device could recreate the currently-displayed layout. Next, in step S1480, the actual data values within each selected data field are then selected in turn. Then, in step S1485, the currently selected data value is output to the data storage device. Once all of the actual data values within each data field are selected, control continues back to step S1470. Once each dimension and measure data field has been selected in step S1470, control continues to step S1490.

In step S1490, a signal indicating the writeback process is complete is output to the data storage device. Then, in step S1495, control returns to the operate state.

Figure 28:
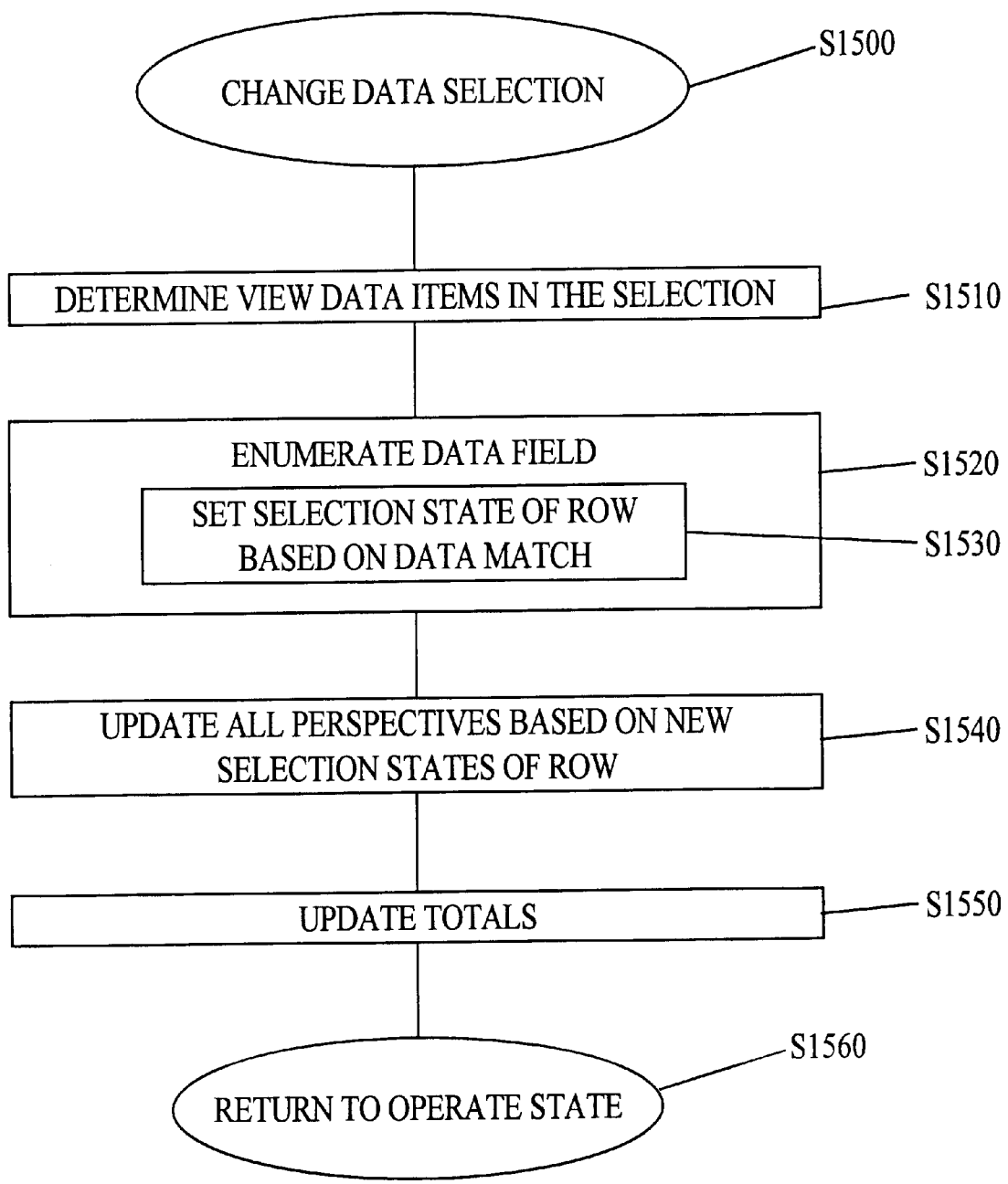
FIG. 28 is a flowchart outlining in greater detail one exemplary embodiment of a method of changing the data selection of FIG. 11.

FIG. 28 is a flowchart outlining in greater detail one exemplary embodiment of a method of changing the data selection of step S1500. When in the operate state, the user may generate an input that changes the selection state of some number of data items within any of the dimensional views or the multiscape view of the single measure perspective, or the various portions of the multiple measures perspective or the anchored measures perspective.

Accordingly, beginning in step S1500, control continues to step S1510, where the data items in the selection region are determined. Then, in step S1520, a control loop is established to select in turn each row of the central data table field that the current perspective is displaying. Then, in step S1530, based on whether the data value is contained in the subset of user-selected items, the selection state of each row is set to either selected or unselected. Once all of the rows of the central data table field being displayed have been selected, control continues to step S1540. It should be appreciated that any such an operation, such as replace, intersect, union, addition, subtraction, select all, unselect all and toggle, as well as any other known or later developed selection operation, could be used in step S1530.

In step S1540, all perspectives are updated based on the new selection states of the rows of the central data table field being displayed. Then, in step S1550, the totals and percentages displayed in the various perspectives are updated. Next, in step S1560, control returns to the operate state.

Figure 29:
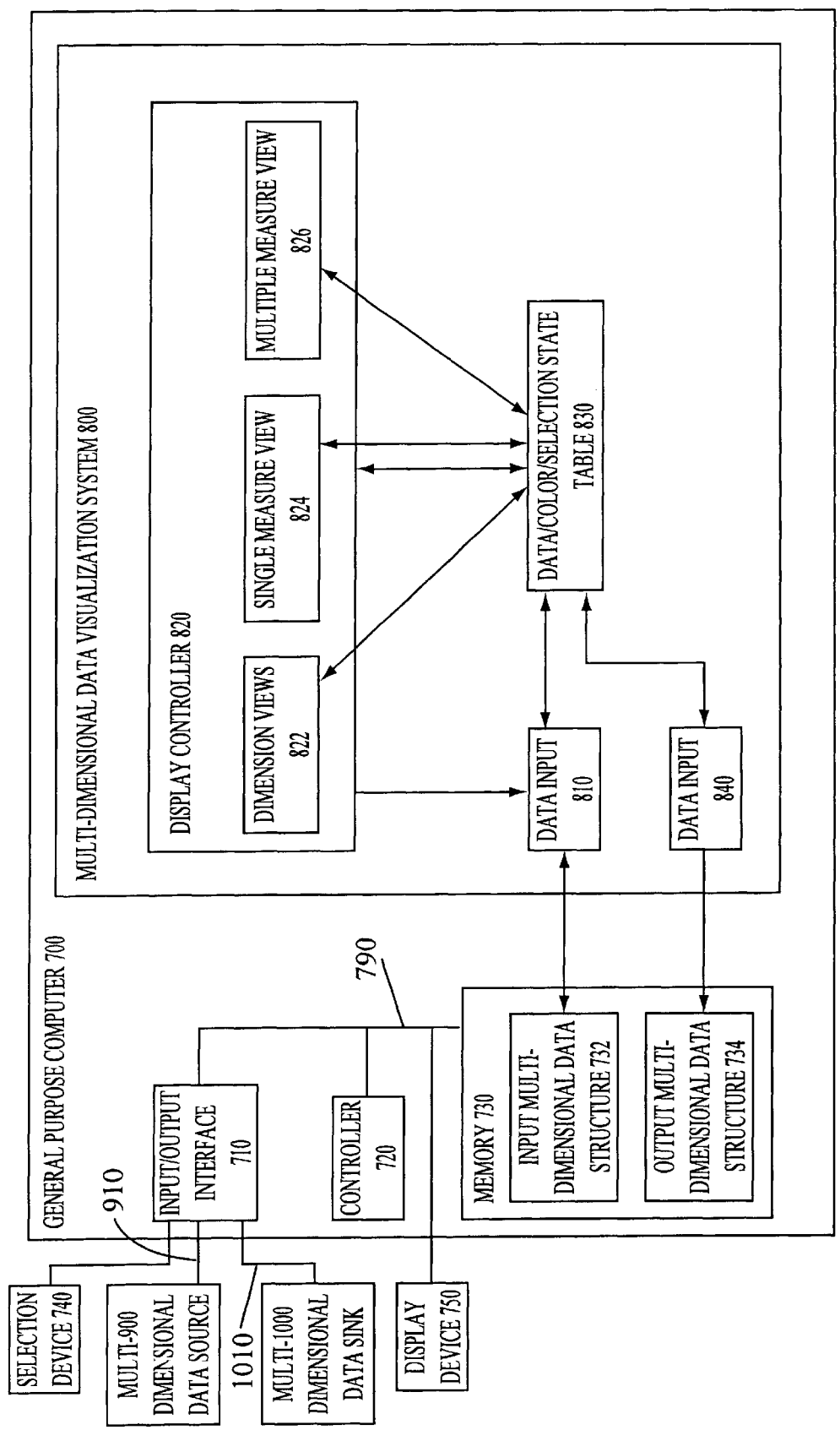
FIG. 29 is a block diagram outlining one exemplary embodiment of the multi-dimensional data structure visualizing systems according to this invention.

FIG. 29 is a block diagram outlining one exemplary embodiment of the multi-dimensional data structure visualizing systems according to this invention. As shown in FIG. 29, the multi-dimensional data structures data visualizing systems of this invention can be implemented using a general purpose computer 700. In the exemplary embodiment shown in FIG. 29, the general purpose computer 700 includes an input-output interface 710, a controller 720, a memory 730 and a display 750, each connected to an internal data/control bus 790. A selection device 740 is connected to the input-output interface 710. The memory 730 includes an input multi-dimensional data structure storage portion 732, and may include an output multi-dimensional data structure storage portion 734. The input multi-dimensional data structure stored in the input multi-dimensional data structure storage portion 732 can be a Microsoft Excel™ pivot table or any other known or later developed multi-dimensional data structure, such as an "OLAP data cube".

In general, the input multi-dimensional data structure stored in the input multi-dimensional data structure storage portion 732 will have been obtained by the general purpose computer 700 from a multi-dimensional data source 900, such as a data warehouse or the like. The multi-dimensional data source 900 can be connected to the general purpose computer 700 over a link 910. The link 910 can be any known or later developed structure for connecting the multi-dimensional data source 900 to the general purpose computer 700, such as a direct cable connection, a connection over a local area network or a wide area network, a connection over a distributed network, such as the Internet, an intranet, an extranet or any other known or later developed distributed network system, or the like.

Should the memory 730 include the output multi-dimensional data structure stored in the output multi-dimensional data structure storage portion 734, that output multi-dimensional data structure can be output through the input-output interface 710 to a multi-dimensional data sink 1000, such as a data warehouse or the like. The multi-dimensional data sink 1000 can be connected to the input-output interface 710 over a link 1010. The link 1010 can be any known or later developed structure for connecting the multi-dimensional data sink 1000 to the input-output interface 710, as set forth above with respect to the link 910.

It should also be appreciated that the multi-dimensional data source 900 and the multi-dimensional data sink 1000 can be same physical device. It should also be appreciated that the multi-dimensional data should 900 and/or the multi-dimensional data sink 1000 can be physically implemented as a non-volatile data storage device implemented within the general purpose computer 700 and directly connected to the data bus 790. In this case, the multi-dimensional data source 900 and/or the multi-dimensional data sink 1000 can be implemented using a large-scale floppy disk and disk drive, such as a ZIP™ or a JAZ™ drive system or the like, a hard drive, a writable optical disk and disk drive, flash memory, or any other large scale data storage device.

The selection device 740 connected to the input/output interface 710 can be any known or later developed device for allowing various elements of the various perspectives displayed on the display 750 to be selected. For example, the selection device 740 could be a mouse, a track ball, a touch pad, a touch screen, or the like.

Also implemented in the general purpose computer 700 is a multi-dimensional data visualization system 800 according to this invention. In general, the multi-dimensional visualization system 800 will be implemented as one or more software routines or programs executing on the general purpose computer 700.

As shown in FIG. 29, the multi-dimensional data visualization system of this invention include a data input circuit or routine 810, a display controller circuit or routine 820, a data/color/selection state table 830 and a data output circuit or routine 840. The data input circuit or routine 810 reads data from the input multi-dimensional data structure stored in the input multi-dimensional data structure storage portion 732 into the multi-dimensional data visualization system 800. Similarly, the data output circuit or routine 840 outputs, if the writeback function control is implemented and executed, a newly created output multi-dimensional data structure to the output multi-dimensional data structure storage portion 734 of the memory 730.

As shown in FIG. 29, the display controller circuit or routine 820 is used to generate a number of dimensional views 822, a single measure view 824 and/or a multiple measure view 826 based on the state of the data/color/selection state table 830 and the input multi-dimensional data structure read by the data input circuit or routine 810. The display controller circuit or routine 820 generates these views, combines them to generate one of the single measure perspective, the multiple measures perspective or the anchored measures perspective, and outputs the generated perspective over the data bus 790 to the display 750 for viewing by the user.

In response, the user, using the selection device 740, inputs data selection data and/or control function data through the input output interface 710. The display controller circuit or routine 820 alters the states in the data/color/selection state table 830 based on the data selection data and/or the control function data input by the user. The display controller circuit or routine 820 then updates one or more of the dimensional view 822, the single measure view 824 and/or the multiple measure view 826 based on the updated data/color/selection state table 830 to generate a new one, or update an old one, of the single measure perspective, multiple measure perspective, and/or the anchored measured perspectives discussed above. The display controller circuit or routine 820 then outputs that perspective to the display 750.

In operation, the multi-dimensional data visualization system 800 begins upon launching a data visualization session. At this time, the multi-dimensional data visualization system 800 initializes the internal states and flags of the data/color/selection state table 830 and the display controller circuit or routine 820. The data input circuit or routine 810 begins loading data by first determining the source of data to be used. For example, the display controller circuit or routine 820 could prompt the user to identify the location of the multi-dimensional data structure. This could be either the input multi-dimensional data structure storage portion 732 or the multi-dimensional data source 900. Ultimately, the data source could be predetermined. For example, if the general purpose computer is currently executing an instance of MS Excel™ and displaying a pivot table, the data input circuit or routine 810 will use that pivot table as the data source.

The data input circuit or routine 810 then determines and loads the data schema. In particular, the data input or routine 810 determines the names and types of the data fields available for use as dimensions and as measures. The data input circuit or routine 810 could also determine additional information, such as the intended field layout, including the dimensions and the measures used in the intended field layout. In one exemplary embodiment, for a pivot table, the field usage of that pivot table would be used as the intended field layout. However, it should be appreciated that the layout could be arbitrarily decided or predefined.

The data input circuit or routine 810 then inputs each dimension field to be used and stores that dimension into the central data table of the data/color/selection state tables 830. These fields are loaded into vectors within a table structure, with a value for each available measure value, i.e., each intersection point of each dimension to be used. These vectors could contain a flat representation of the data, or could remain in normalized state, with a simple control routine being used to determine the corresponding values between all dimensions and all measures. As the data for each dimension is loaded into the central data table, the presence and usage of this field is indicated to the display controller circuit or routine 820.

Then, each measure field to be used is located into the central data table. As the data for each measure is loaded into the central data table, the presence and usage of this measure field is also indicated to the display controller circuit or routine 820. After all of the dimension and measure fields to be used have been loaded into the central data table, the data input circuit or routine 810 outputs an indication to the display controller to place the display controller into an operate state to allow the user to interact with the various displayed perspectives.

While the data input circuit or routine 810 is loading data into the multidimensional data visualization system 800, the data input circuit or routine 810 will occasionally instruct the display controller circuit or routine 820 to add a row dimension or a column dimension to appropriate ones of the various perspectives of the multidimensional data visualization system 800. In response, the display controller circuit or routine 820 adds a dimensional view 822 to the single measure perspective to display the dimension data for that dimension. In particular, each dimensional view has properties that must be set to indicate the central table data fields to be used to weight the displayed data and to be used as the color-by fields that are used to control the displayed colors. These properties are set to the appropriate field names in the central data table.

Because display axes must be built when the multiscape view of the single measure perspective is required to display more than two dimensions, the newly added row or column is indicated to an axes building circuit or routine (not shown). The newly added row or column dimension is also added to a list of available dimensions that the user can access to rearrange the dimensions in the various perspectives. The newly added row or column dimension is also provided in a list control of a combo box of fields, which is used to control the displayed colors of the displayed data. The display controller circuit or routine 820 then associates the dimensional view with the appropriate perspective so it can be displayed.

Similarly, when the data input routine or circuit 810 inputs a page dimension, the display controller circuit or routine 820 inserts a page dimension to the various perspectives by adding a combo box control widget to the corresponding perspectives. In particular, the display controller circuit or routine 820 builds a list of the unique values within the field data and adds these unique values to the list menu control of the combo box. Additionally, the display controller circuit or routine 820 adds an "all" value to the list of the unique values. The "all" value is also added to a list of available dimensions used to rearrange the displayed dimensions. The page dimension is also added to a list control menu of a combo box of fields used to determine the measure or dimension used to determine the color mapping in the various perspectives. The display controller circuit or routine 820 then adds the combo box with the new page dimension to the appropriate perspectives.

When the data input circuit or routine 810 inputs a new measure field, the data input circuit or routine 810 generates an indication to the display controller circuit or routine 820. In response, the display controller circuit or routine 820 adds a measure field to the list of available measures of a combo box list contained in the various perspectives. The combo box list allows the user to select a single measure for weighting all of the row and column dimensions in the dimensional views, as well as to be the single measure used in the multiscape view of the single measure perspective. The measure field is also added by the display controller circuit or routine 820 to the list menu control of the combo box of fields so that the measure can be used to control the color mapping.

During operation, the display controller circuit or routine 820 is driven by user interface events and operations. These events and operations may occur in any order based on control functions input from the user. These events and operations may be interspersed with other events and operations that are not essential to the main operation of the multi-dimensional data visualization system 800 and thus are not discussed herein.

Of course, should the user input a stop command, the display controller circuit or routine 820 will deallocate any resources that it has allocated during operation. Then, the general purpose computer 700 will remove the multi-dimensional data visualization system 800 from the list of executing processes.

Should the user generate an input to display a different item within a given page dimension, the display controller circuit or routine 820 will execute a page change routine. In particular, the display controller circuit or routine 820 will identify those rows in the data/color/selection state table that match a page value input by the user. The display controller circuit or routine 820 will update the various perspectives to display only those rows that match the input page value from the user.

Should the user generate an input to select a particular measure to be used to weight the dimensional views and the multiscape view of the single measure perspective and to weight the displays of the multiple measures and anchor measures perspectives, the display controller circuit or routine 820 will execute a measure change routine. In particular, the display controller circuit or routine 820 will set a "weight-by" property of the single measure perspective, a "weight-by" property of the multiple measures and anchored measures perspective and a "weight-by" property of each dimensional view of the single measure perspective to the measure selected by the user. The display controller circuit or routine 820 will then update the various perspectives to reflect the change in the displayed information.

Should the user generate an input setting a particular dimension or measure as the basis for coloring the various views in the various perspectives, the display controller circuit or routine 820 will execute a color change routine. In particular, the display controller circuit or routine 820 will associate a range of color values with a range of data values for the selected dimension or measure. Specifically, the display controller circuit or routine 820 will set the "color-by" property of the central data table 830 to the selected dimension or measure. The data/color/selection state table 830 will then internally construct a new mapping between the data values for the selected dimension or measure and a predetermined color range. Any changes within the data/color/selection state table 830 will be recognized by the display controller circuit or routine 820 for any one of the various perspectives displaying data from the central data table. The display controller circuit or routine 820 will in turn update the display of these perspectives accordingly.

The user may generate an input to change the particular perspective being displayed on the display device 750. In response, the display controller circuit or routine 820 will set an internal flag to indicate the perspective to be displayed. This flag is used to determine the perspective when the display 750 needs to be subsequently updated.

When the display 750 needs to be updated, the display controller circuit or routine 820 will then test the flag to determine the current state of the flag. Based on the state of the flag, the display controller circuit or routine 820 will output the appropriate perspective to the display 750.

Should the user generate an input to change the table layout, or to change which dimensions represent columns, rows or pages, or to change the order in which the dimensions are displayed the display controller circuit or routine 820 will execute a layout change routine. In this case, in one exemplary embodiment of the systems and methods of this invention, the display controller circuit or routine 820 will generate a separate layout perspective that places the various views and portions of the various perspectives using small dragable icons. The user then moves the various dragable icons about the table layout perspective. Once the user is satisfied with the new layout, the user generates an acceptance input. In response, the display controller circuit or routine 820 removes all of the current page, column and row information and regenerates this information as described above to add the new page column and row dimensions.

Should the user generate an input indicating that a currently displayed subset of data is to be written back into a new multi-dimensional data structure, the display controller circuit or routine 820 outputs a form to the display 750 to allow the user to input a name for the data to be written and to identify the subset of the data to be written back. Once the user indicates the data is acceptable, the data output circuit or routine circuit 840 will output, either to the output multi-dimensional data structure data storage portion 734 or the multi-dimensional data sink 1000, the name specified by the user to allow that storage device to either select storage with that name or to create a new storage with that name. The data output circuit or routine 840 can retrieve a reference to this named data storage area, if necessary to facilitate transferring data into that named data storage area.

The data output circuit or routine 840 will then extract data from the data/color/selection state table 830 based on the subset of the data indicated by the user to transfer to the data storage device the data field name and data type. If appropriate, the data output circuit 840 will also transfer the layout information to the storage device so that the currently displayed layout can be created. Then, the data output circuit or routine 840 outputs the actual data values based on the subset of data selected by the user and transfers the extracted data values to the storage device.

Should the user generate an input indicating the selection state of some number of data items within the currently displayed perspective is to be changed, the data controller circuit or routine 820 will execute a data selection change routine. It should be appreciated that the data selection routine executed by the display controller will be, to some degree, specific to each particular view of each particular perspective. Moreover, the particular data items over which the user can make a selection will also be determined by the particular perspective currently being displayed.

In response, the data/color/selection state table 830 will set the selection state of each row of the central data table field for the currently displayed perspective to either selected or unselected based on the data value contained in the subset of user-selected items. Then, the data/color/selection state table 830 will publish an event to interested clients that the selection state of the central data table field has changed.

Any other views or perspectives displaying fields within this table will response to the published event by redrawing the view or perspective to reflect the change of the selection state. The display controller circuit or routine 820 will also respond to this event by updating the totals displayed on the currently displayed view. It should be appreciated that any type of selection operation, such as addition, subtraction, replace, intersect, union, select all, unselect all and toggle, as well as any other known or later developed selection operation could be indicated by the input generated by the user.

The various novel perspectives provided by various exemplary embodiments of the systems and methods according to this invention provide a number of advantages. The single measure perspective, the multiple measures perspective and the anchored measures perspective according to this invention extend pivot-table analysis techniques. For example, the systems and methods according to this invention allow a user to analyze and understand larger multi-dimensional data structures. Using existing interfaces, it is difficult to understand pivot tables having more than tens of rows and columns. The visual techniques provided by various exemplary embodiments of the systems and methods according to this invention allow a user to understand pivot tables and other multi-dimensional data structures having hundreds (or more) of rows and columns.

Furthermore, the linked bar chart views of the single measure perspective and the multiple measures perspective show measure roll-ups by dimension. These bar chart views can easily show dimensions with thousands of entities. Additionally, the selection and navigation functions provided by various exemplary embodiments of the systems and methods according to this invention enable a user to compare arbitrary regions of tables, rather than limiting the user to pre-defined subtables. That is, various exemplary embodiments of the systems and methods according to this invention provide the user with the ability to generate ad hoc comparisons.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for visually analyzing data of a multi-dimensional data structure having a plurality of dimensions and at least one measure, comprising:

generating at least one perspective, each perspective having a dimensional view portion and a multi-dimensional view portion, the dimensional view portion having at least one dimensional view, each dimensional view displaying one of the at least one measure against one of the plurality of dimensions, the multi-dimensional view portion having a multi-dimensional view displaying data items of the multi-dimensional data structure corresponding to at least one of the at least one measure and at least two of the plurality of dimensions;

displaying one of the at least one generated perspective;

displaying a multi-dimensional analysis toolbar, wherein the toolbar comprises:
  a replace selection mode button that causes a new selection data set to replace the previous selection data set;
  an intersect selection mode button that combines the previous and current data sets to form a new, intersecting, data set; and
  an add selection mode button that extends the previous selection data set by forming a new effective selection set as a union with the previous selection data set and the new selection data set;

selecting a portion of the data being displayed by selecting a portion of one of the multi-dimensional view and the at least one dimensional view of the displayed perspective; and altering, using the multi-dimensional analysis toolbar, the selected portion of the data being displayed.

2. The method of claim 1, wherein generating at least one perspective comprises:
  determining a data schema of the multi-dimensional data structure, the data schema defining the dimensions and the measures of the multi-dimensional data structure and at least one relationship between the dimensions, between the measures, or between the dimensions and the measures;
  selecting a plurality of dimensions of the multi-dimensional data structure;
  creating a data table for each selected dimension;
  selecting at least one measure of the multi-dimensional data structure;
  creating a data table for each selected measure; and
  creating a layout of each at least one perspective based on the selected dimensions and at least one selected measure.

3. The method of claim 2, wherein selection a plurality of dimensions of the multi-dimensional data structure comprises selecting a column dimension or a row dimension of the multi-dimensional data structure.

4. The method of claim 3, wherein creating the data table for a selected column or row dimension comprises:
  setting at least one of dimensional view data, weighting data and color by data to corresponding data table fields of a data table for that selected dimension;
  adding the selected dimension to a list of available dimensions; and
  adding the selected dimension to a list of available color-by fields.

5. The method of claim 3, wherein creation a layout of each at least one perspective based on a selected column or row dimension comprises:
  creating at least one dimensional view for the selected dimension; and
  adding each created dimensional view for the selected dimension to at least one of the at least one perspective.

6. The method of claim 2, wherein selecting a plurality of dimensions of the multi-dimensional data structure comprises selecting a page dimension of the multi-dimensional data structure.

7. The method of claim 6, wherein creating the data table for a selected page dimension comprises:
  adding the selected page dimension to a list of available dimensions; and
  adding the selected page dimension to a list of available color-by fields.

8. The method of claim 6, wherein creating a layout of each at least one perspective based on a selected page dimension comprises:
  adding a combo box control to each at least one perspective if the at least one perspective does not already contain the combo box control;
  adding the selected page dimension to a combo box list of the combo box control.

9. The method of claim 2, wherein creating the data table for each selected measure comprises:
  adding the selected measure to a list of available measures; and
  adding the selected measure to a list of weighting fields; and
  adding the selected measure to a list of available color-by fields.

10. The method of claim 1, wherein generating the at least one perspective comprises generating at least one of at least a single measure perspective and a multiple measures perspective.

11. The method of claim 10, wherein generating the single measure perspective comprises:
  determining a single measure for the single measure perspective;
  determining at least two column or row dimensions for the single measure perspective;
  generating a dimensional view for each determined column or row dimension based on the determined single measure;
  determining at least one page dimension for the single measure perspective;
  generating a combo box control for the determined at least one page dimension;
  determining axis fields for the determined at least two column or row dimensions; and
  generating a single measure multi-dimensional view based on the determined axis fields and the determined measure.

12. The method of claim 11, wherein displaying the single measure perspective comprises:
  displaying the dimensional view for each determined column or row dimension in the dimensional view portion of the single measure perspective;
  displaying the combo box control for the determined at least one page dimension in the single measure perspective;
  displaying the single measure multi-dimensional view in the multi-dimensional view portion; and
  weighting the single measure multi-dimensional view based on a selected one of the determined dimensions.

13. The method of claim 12, wherein displaying the multiple measures perspective comprises:
  displaying the dimensional view for each determined column or row dimension in the dimensional view portion of the multiple measures perspective;

displaying the combo box control for the determined at least one page dimension in the multiple measures perspective;

displaying the multiple measures multi-dimensional view in the multi-dimensional view portion;

weighting the multiple measures multi-dimensional view based on a selected one of the determined dimensions.

14. The method of claim 11, wherein generating a dimensional view for each determined column or row dimension based on the determined single measure comprises generating one of at least a bar chart, a pie chart, a line chart or a bubble plot as the dimensional view for each determined column or row dimension.

15. The method of claim 10, wherein generating the multiple measures perspective comprises:

determining a plurality of measures for the multiple measures perspective;

determining at least two column or row dimensions for the multiple measures perspective;

generating a dimensional view for each determined column or row dimension;

determining at least one page dimension for the multiple measures perspective;

generating a combo box control for the determined at least one page dimension; and generating a multiple measures multi-dimensional view based on the determined column, row and page dimensions and the determined measures.

16. The method of claim 15, wherein the multiple measures perspective is one of a box plot multiple measures perspective and a scatterplot multiple measures perspective.

17. The method of claim 16, wherein, when multiple measures perspective is the box plot multiple measures perspective, generating the multiple measures multi-dimensional view based on the determined column, row and page dimensions and the determined measures comprises generating one box plot for each determined measure.

18. The method of claim 16, wherein, when multiple measures perspective is the scatter plot multiple measures perspective, generating the multiple measures multi-dimensional view based on the determined column, row and page dimensions and the determined measures comprises generating a scatter plot for two of the determined measures, each point of the scatter plot weighted based on the selected dimension.

19. The method of claim 10, wherein generating at least one perspective further comprises generating an anchored measures perspective.

20. The method of claim 19, wherein generating the anchored measures perspective comprises:

determining a plurality of measures for the multiple measures perspective;

determining at least two column or row dimensions for the multiple measures perspective;

generating a set of bubble plots for each determined column or row dimension;

determining at least one page dimension for the multiple measures perspective;

generating a combo box control for the determined at least one page dimension; and generating a parabox view based on the determined column, row and page dimensions and the determined measures, the parabox view comprising one box plot for each determined measure.

21. The method of claim 20, wherein displaying the anchored measures perspective comprises:

displaying the set of bubble plots for each determined column or row dimension in the dimensional view portion of the multiple measures perspective;

displaying the combo box control for the determined at least one page dimension in the multiple measures perspective;

displaying the parabox view in the multi-dimensional view portion;

weighting the bubble plots and the parabox view based on a selected one of the determined dimensions.

22. The method of claim 1, wherein displaying the at least one generated perspective comprises displaying one of at least a single measure perspective and a multiple measures perspective.

23. The method of claim 22, wherein displaying the at least one generated perspective further comprises displaying an anchored measures perspective.

24. The method of claim 1, wherein altering an appearance of the multi-dimensional view and the at least one dimensional view of each of the at least one perspective based on each data item of the multi-dimensional data structure that corresponds to the selected portion comprises:

determining a selection mode;

determining the data items in the multi-dimensional data structure corresponding to the selected portion based on the determined selection mode; and updating an appearance of each dimensional view and each multi-dimensional view of each at least one perspective based on the determined data items.

25. The method of claim 1, further comprising writing back data to one of the multi-dimensional data structure and a new multi-dimensional data structure based on the selected portion.

26. The method of claim 1, wherein displaying one of the at least one generated perspective comprises:

receiving at least one user input identifying the one of the at least one generated perspective to be displayed;

hiding a currently displayed one of the at least one generated perspective; and displaying the identified one of the at least one generated perspective.

27. The method of claim 1, wherein displaying one of the at least one generated perspective comprises:

receiving at least one user input identifying a measure to be visualized of the at least one measure;

altering the multi-dimensional view portion of each at least one perspective based on the identified measure to display data items of the multi-dimensional data structure corresponding to the identified measure; and altering each dimensional view of the dimensional view portion of each at least one perspective based on the identified measure.

28. The method of claim 1, further comprising:

receiving a user input identifying a measure to be visualized in the multi-dimensional view and the at least one dimensional view of each of the at least one perspective; and updating the multi-dimensional view and the at least one dimensional view of each of the at least one perspective to visualize data items in the multi-dimensional data structure corresponding to the identified measure.

29. The method of claim 1, wherein displaying one of the at least one generated perspective comprises:

receiving at least one user input identifying a page dimension to be visualized;

altering the multi-dimensional view portion of each at least one perspective based on the identified measure to display data items of the multi-dimensional data structure corresponding to the identified page dimension; and altering each dimensional view of the dimensional view portion of each at least one perspective based on the identified page dimension.

30. The method of claim 1, wherein, when the dimensional views of the dimensional view portion are bar chart views, selecting a portion of one of the multi-dimensional view and the at least one dimensional view of the displayed perspective comprises receiving a user input identifying at least one bar of one of the bar chart views.

31. The method of claim 30, wherein altering the appearance of the multi-dimensional view and the at least one dimensional view of each of the at least one perspective based on the selected portion, when the received user input identifies at least one bar of one of the bar chart views, comprises setting portions of the multi-dimensional view and the at least one dimensional view of each of the at least one perspective corresponding to the at least one selected bar to a selected state based on an active selection mode.

32. The method of claim 1, wherein generating the at least one perspective comprises:
determining a number of values of the data items in the multi-dimensional data structure corresponding to the at least one measure and the at least one dimension;
assigning rendering values to the values of the data items in the multi-dimensional data structure corresponding to the at least one measure and the at least one dimension based on the determined number and a predetermined range of rendering values.

33. The method of claim 1, further comprising:
a textual query selection mode button that activates a text string measure selection graphical user interface.

34. The method of claim 1, further comprising:
a toggle selection mode to unselect those data items which were previously selected while those data items which were previously unselected become selected.

35. The method of claim 1, further comprising an unselect-all mode which causes all data entries to be unselected.

36. The method of claim 1, wherein each perspective dimensional view portion and each multi-dimensional view portion comprise the same type of chart.

37. The method of claim 36, wherein the type of chart is a bar-chart.

38. A method for visually generating a query related to data on a multi-dimensional data structure having a plurality of dimensions and at least one measure, comprising:
generating at least one perspective, each perspective having a dimensional view portion and a multi-dimensional view portion, the dimensional view portion having at least one dimensional view, each dimensional view displaying one of the at least one measure against one of the plurality of dimensions, the multi-dimensional view portion having a multi-dimensional view displaying at least one of the at least one measure against at least two of the plurality of dimensions;
displaying one of the at least one generated perspective;
displaying a multi-dimensional analysis toolbar, wherein the toolbar comprises:
a replace selection mode button that causes a new selection data set to replace the previous selection data set;
an intersect selection mode button that combines the previous and current data sets to form a new, intersecting, data set; and
an add selection mode button that extends the previous selection data set by forming a new effective selection set as a union with the previous selection data set and the new selection data set;
selecting a portion of the data being displayed by selecting a portion of one of the multi-dimensional view and the at least one dimensional view of the displayed perspective;
querying the multi-dimensional data structure based on data items of the multi-dimensional data structure corresponding to the selected portion; and
altering, using the multi-dimensional analysis toolbar, an appearance of the multi-dimensional view and the at least one dimensional view of each of the at least one perspective based on results of the query.

39. The method of claim 38, wherein querying the multi-dimensional data structure based on data items of the multi-dimensional data structure corresponding to the selected portion comprises:
determining a selection mode;
determining the data items in the multi-dimensional data structure for querying the multi-dimensional data structure based on the selected portion and the determined selection mode; and
querying the multi-dimensional data structure based on the determined data items of the multi-dimensional data structure, and further wherein determining the data items in the multi-dimensional data structure for querying the multi-dimensional data structure based on the selected portion and the determined selection mode further comprises determining the data items in the multi-dimensional data structure for querying the multi-dimensional data structure based on the selected portion, at least one other portion of one of the multi-dimensional view and the at least one dimensional view of the displayed perspective and the determined selection mode.

40. The method of claim 38, further comprising writing back data to one of the multi-dimensional data structure and a new multi-dimensional data structure based on the results of the query.

41. The method of claim 40, wherein writing back data to the data source, comprising:
creating a write-back form;
displaying the write-back form to a user to select a name for the data to be written-back;
determining whether the user has indicated that the current state of the write-back form is acceptable;
allowing the user to change the name and subset of the data to be written-back;
determining if the write-back process is complete; and
permitting a user to operate on the written back data.

42. A visual analysis system for visually analyzing data of a multi-dimensional data structure having a plurality of dimensions and at least one measure, comprising:
a memory that stores the data items of the multi-dimensional data structure;
a rendering system capable of rendering at least one perspective, each perspective having a dimensional view portion and a multi-dimensional view portion, the dimensional view portion having at least one dimensional view, each dimensional view displaying one of the at least one measure against one of the plurality of dimensions, the multi-dimensional view portion having a multi-dimensional view displaying data items of the multi-dimensional data structure corresponding to at least one of the at least one measure an at least one of the plurality of dimensions;
a display device capable of displaying the at least one perspective and a multi-dimensional analysis toolbar, wherein the toolbar comprises:
replace selection mode button that causes a new selection data set to replace the previous selection data set;
an intersect selection mode button that combines the previous and current data sets to form a new, intersecting, data set; and
an add selection mode button that extends the previous selection data set by forming a new effective selection set as a union with the previous selection data set and the new selection data set;
a selection device capable of selecting at least one selection mode button of the multi-dimensional analysis toolbar and a portion of the data being displayed by selecting a portion of one of the multi-dimensional view and the at least one dimensional view of the displayed perspective.

43. The visual analysis system of claim 42, wherein the rendering system comprises:
a display controller; and
a data/color/selection state table, and further wherein the display controller comprises:
means for rendering at least one dimensional view;
means for rendering at least one single measure view; and
means for rendering at least one multiple measures view.

44. The visual analysis system of claim 43, wherein the rendering system alters an appearance of the multi-dimensional view and the at least one dimensional view of each of the at least one perspective based on the selected portion.

45. The visual analysis system of claim 43, wherein the at least one perspective comprises at least one of at least a single measure perspective and a multiple measures perspective.

46. The visual analysis system of claim 45, wherein, when the displayed perspective is the single measure perspective, the rendering system renders the multi-dimensional view as a three-dimensional graph plotting at least one dimension along each of a first axis and a second axis, and a single measure along a third axis.

47. The visual analysis system of claim 45, wherein, when the displayed perspective is the multiple measures perspective, the rendering system renders the multi-dimensional view as a two-dimensional scatter plot with one measure plotted along each of a first axis and a second axis, an appearance of the points of the scatter plot based on a selected dimension.

48. The visual analysis system of claim 45, wherein, when the displayed perspective is the multiple measures perspective, the rendering system renders the multi-dimensional view as a set of box plots, the box plot multi-dimensional view displaying data corresponding to a plurality of measures, each box plot corresponding to one of the plurality of measures.

49. The visual analysis system of claim 45, wherein the at least one perspective further comprises at least one an anchored measures perspective.

50. The visual analysis system of claim 49, wherein, when the displayed perspective is the anchored measures perspective, the rendering system renders the multi-dimensional view as a set of box plots, the box plot multi-dimensional view displaying data corresponding to a plurality of measures, each box plot corresponding to one of the plurality of measures.

51. The visual analysis system of claim 50, wherein, when the displayed perspective is the anchored measures perspective, the rendering system renders each dimensional view as number of sets of bubble plots, each set of bubble plots corresponding to one of a plurality of dimensions.

52. The visual analysis system of claim 43, wherein, when the displayed perspective is the single measure perspective or the multiple measures perspective, the rendering system renders each dimensional view as a bar chart.

53. The visual analysis system of claim 42, wherein the rendering system renders an appearance of the displayed multi-dimensional view based on one of at least one displayed dimension, and further wherein the rendering system further renders an appearance of the displayed multi-dimensional view based on a displayed measure.

54. The visual analysis system of claim 42, wherein, when a portion of one of the multi-dimensional view and the at least one dimensional view of the displayed perspective is selected, the rendering system alters an appearance of the multi-dimensional view and the at least one dimensional view of each of the at least one perspective based on each data item of the multi-dimensional data structure that corresponds to the selected portion.

55. The visual analysis system of claim 54, wherein the rendering system alters the appearance of the multi-dimensional view and the at least one dimensional view of each of the at least one perspective further based on a selection mode associated with selected portion.

56. The visual analysis system of claim 55, wherein the rendering system determines the data items in the multi-dimensional data structure corresponding to the selected portion based on the selection mode associated with selected portion.

57. The visual analysis system of claim 55, wherein, when a data item of the multi-dimensional data structure is selected, the rendering systems renders the appearance of corresponding portions of the multi-dimensional view and the at least one dimensional view of each of the at least one perspective based on values of the selected measure, and when a data item of the multi-dimensional data structure is unselected, the rendering systems renders the appearance of corresponding portions of the multi-dimensional view and the at least one dimensional view of each of the at least one perspective in a neutral state.

58. A graphical user interface for visually analyzing data of a multi-dimensional data structure having a plurality of dimensions and at least one measure, comprising:
a perspectives portion, comprising:
a dimensional views portion containing a plurality of dimensional views; and
a multi-dimensional view portion,
wherein an appearance of a portion of the data being displayed in at least one of the plurality of dimensional views and the multi-dimensional view portion is selected and altered, while original values of the data are preserved; and
a multi-dimensional analysis toolbar, wherein the toolbar comprises:
a replace selection mode button that causes a new selection data set to replace the previous selection data set;
an intersect selection mode button that combines the previous and current data sets to form a new, intersecting, data set; and
an add selection mode button that extends the previous selection data set by forming a new effective selection set as a union with the previous selection data set and the new selection data set.

59. The graphical user interface of claim 58, wherein the perspectives portion is capable of displaying one of at least a single measures perspective and a multiple measures perspective.

60. The graphical user interface of claim 59, wherein, when the perspectives portion displays the single measure perspective, the multi-dimensional view portion displays a three-dimensional graph plotting at least one dimension along each of a first axis and a second axis, and a single measure along a third axis, and the dimensional views portion displays a number of dimensional views equal to the number of dimensions plotted along the first and second axes, each dimensional view plotting one of the dimensions plotted along the first and second axes against the single measure.

61. The graphical user interface of claim 59, wherein, when the perspectives portion displays the multiple measures perspective, the multi-dimensional view portion displays a two-dimensional scatter plot with one measure plotted along each of a first axis and a second axis, an appearance of the points of the scatter plot based on a selected dimension, and the dimensional views portion displays a plurality of dimensional views, each dimensional view plotting a dimension of the multi-dimensional data structure against one of the measures plotted along the first and second axes.

62. The graphical user interface of claim 59, wherein, when the perspectives portion displays the multiple measures perspective, the multi-dimensional view portion displays at least one box plot, each box plot corresponding to one measure of the multi-dimensional data structure, and the dimensional views portion displays a plurality of dimensional views, each dimensional view plotting a dimension of the multi-dimensional data structure against one of the measures displayed in the multi-dimensional view portion, each box plot plotting one of the plurality of measures against a selected one of the plurality of dimensions.

63. The graphical user interface of claim 58, wherein the perspectives portion is further capable of displaying one of an anchored measures perspective.

64. The graphical user interface of claim 63, wherein, when the perspectives portion displays the anchored measures perspective, the multi-dimensional view portion displays at least one box plot and the dimensional views portion displays at least one set of bubble plots, each set of bubble plots plotting one of a plurality of dimensions against a selected one of the plurality of measures, each box plot plotting one of a plurality of measures against a selected one of the plurality of dimensions.

65. The graphical user interface of claim 58, wherein the toolbar further comprises:

a select perspective control portion;

a select color by field control portion; and a select measure control portion.

66. The graphical user interface of claim 58, wherein the toolbar further comprises:

a select all button that causes all portions of the displayed perspective to be selected;

an unselect all button that causes all portions of the displayed perspective to be unselected; and a toggle selection button that causes all currently-unselected portions of the displayed perspective to be selected and that causes all currently-selected portions of the displayed perspective to be unselected.

67. The graphical user interface of claim 58, wherein the toolbar further comprises:

an exclude button that causes the unselected items to be removed from the at least one perspective when the at least one perspective is displayed; and an restore button that causes any previously excluded items to be restored to the at least one perspective when the at least one perspective is displayed.

68. The graphical user interface of claim 58, wherein the toolbar further comprises a write-back button that causes a new multi-dimensional data structure to be created based on the data items of the multi-dimensional data structure that correspond to the selected portions of the displayed perspective.

69. A method for visually analyzing data of a multi-dimensional data structure having a plurality of dimensions and at least one measure, comprising:

generating at least one perspective, each perspective having a dimensional view portion and a multi-dimensional view portion, the dimensional view portion having at least one dimensional view, each dimensional view displaying one of the at least one measure against one of the plurality of dimensions, the multi-dimensional view portion having a multi-dimensional view displaying data items of the multi-dimensional data structure corresponding to at least one of the at least one measure and at least two of the plurality of dimensions;

displaying one of the at least one generated perspective;

displaying a multi-dimensional analysis toolbar, wherein the toolbar comprises at least one of:

a replace selection mode button that causes a new selection data set to replace the previous selection data set;

an intersect selection mode button that combines the previous and current data sets to form a new, intersecting, data set; and an add selection mode button that extends the previous selection data set by forming a new effective selection set as a union with the previous selection data set and the new selection data set;

selecting a portion of the data being displayed by selecting a portion of one of the multi-dimensional view and the at least one dimensional view of the displayed perspective; and altering, using the multi-dimensional analysis toolbar, the selected portion of the data being displayed; and simultaneously generating three perspectives, including a single measure perspective, a multiple measures perspective and an anchored measures perspective, each perspective having a dimensional view portion and a multi-dimensional view portion, the dimensional view portion having at least one dimensional view, each dimensional view displaying one of the at least one measure against one of the plurality of dimensions, the multi-dimensional view portion having a multi-dimensional view displaying data items of the multi-dimensional data structure corresponding to at least one of the at least one measure and at least two of the plurality of dimensions.

* * * * *